US009357104B2

(12) United States Patent
Toyoda et al.

(10) Patent No.: US 9,357,104 B2
(45) Date of Patent: May 31, 2016

(54) IMAGE TRANSMITTING/RECEIVING SYSTEM, IMAGE TRANSMITTING APPARATUS, RECEIVED IMAGE DISPLAYING APPARATUS, WIRELESS CONTROL APPARATUS, AND IMAGE TRANSMITTING/RECEIVING METHOD

(71) Applicant: OLYMPUS CORPORATION, Tokyo (JP)

(72) Inventors: Kiyoshi Toyoda, Tokyo (JP); Shinya Kawasaki, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 283 days.

(21) Appl. No.: 14/047,625

(22) Filed: Oct. 7, 2013

(65) Prior Publication Data
US 2014/0028916 A1  Jan. 30, 2014

Related U.S. Application Data

(63) Continuation of application No. PCT/JP2012/054694, filed on Feb. 27, 2012.

(30) Foreign Application Priority Data

Apr. 11, 2011  (JP) ................................. 2011-087534

(51) Int. Cl.
H04N 5/12 (2006.01)
H04N 21/43 (2011.01)
(Continued)

(52) U.S. Cl.
CPC ............... *H04N 5/12* (2013.01); *H04N 5/0733* (2013.01); *H04N 21/4307* (2013.01); *H04N 21/43637* (2013.01)

(58) Field of Classification Search
None
See application file for complete search history.

(56) References Cited

U.S. PATENT DOCUMENTS 4,091,422 A * 5/1978 Amster ................ H04N 5/0733
                                              348/211.11
5,311,311 A * 5/1994 Harigai ................ H04N 5/9206
                                              348/473
(Continued)

FOREIGN PATENT DOCUMENTS

JP       06-038124 A      2/1994
JP       06-165059 A      6/1994
JP       2003-318790 A    11/2003
(Continued)

OTHER PUBLICATIONS

International Search Report for PCT/JP2012/054694, Mailing Date of Mar. 27, 2012.
(Continued)

*Primary Examiner* — Ian N Moore
*Assistant Examiner* — Brian T Le
(74) *Attorney, Agent, or Firm* — Westerman, Hattori, Daniels & Adrian, LLP

(57) ABSTRACT

A received image displaying apparatus comprises: a wireless communication unit that wirelessly receives the frame images transmitted by the image transmitting apparatus with which the received image displaying apparatus has established a connection of wireless communication; and a displaying unit that displays the frame images, which were wirelessly received by the wireless communication unit, in an order in which the frame images were captured. At least one of the image transmitting apparatus and the received image displaying apparatus comprises: a reference sync signal generating unit that generates the reference sync signals; and a control unit that, if the wireless communication unit has received no reference sync signals for a certain time interval, controls the reference sync signal generating unit to generate reference sync signals and that further controls the wireless communication unit to wirelessly transmit the reference sync signals to the other apparatus included in the image transmitting/receiving system.

24 Claims, 20 Drawing Sheets

(51) Int. Cl.
*H04N 21/4363* (2011.01)
*H04N 5/073* (2006.01)

(56) References Cited

U.S. PATENT DOCUMENTS

2010/0120380 A1  5/2010  Otani et al.
2011/0007168 A1* 1/2011  Nagara .................. H04N 5/775
                                                       348/193

FOREIGN PATENT DOCUMENTS

| JP | 2010-050930 A | 3/2010 |
| JP | 2010-068350 A | 3/2010 |
| WO | 96/37075 A1 | 11/1996 |

OTHER PUBLICATIONS

Extended European Search Report dated Aug. 1, 2014, corresponding to European Patent Application No. 12770648.9 (8 pages).

* cited by examiner

FIG. 6

| ID | Tx ID | CH ID | Rx ID | Sync |
|----|-------|-------|-------|------|
| 001 | 0001 | 001 | 0001 | OK | } 601
| 002 | 0002 | 002 | 0002 | OK | } 602
| 003 | 0002 | 002 | 0003 | OK | } 603
| 004 | 0003 | 003 | 0004 | OK | } 604

FIG. 7

| ID | Tx ID | CH ID | Rx ID | Sync |
|----|-------|-------|-------|------|
| 001 | 0001 | 001 | 0001 | OK | } 701
| 002 | 0002 | 002 | 0002 | OK | } 702
| 003 | 0003 | 003 | 0003 | OK | } 703
| 004 |  | 005 | 0004 | None | } 704
| 005 | 0004 | 007 | 0005 | During | } 705

DEVICE HAVING RECEIVED REFERENCE SYNCHRONIZATION
SIGNAL IMMEDIATELY AFTER ACK SIGNAL TRANSMITS
IMAGE SIGNAL AFTER TIME t_ack, AND THUS
SYNCHRONIZATION OF BLANKING INTERVAL IS POSSIBLE

IMAGE TRANSMITTING/RECEIVING SYSTEM, IMAGE TRANSMITTING APPARATUS, RECEIVED IMAGE DISPLAYING APPARATUS, WIRELESS CONTROL APPARATUS, AND IMAGE TRANSMITTING/RECEIVING METHOD

CROSS REFERENCE TO RELATED APPLICATIONS

This application is a continuation application based on a PCT Patent Application No. PCT/JP2012/054694, filed Feb. 27, 2012, whose priority is claimed on Japanese Patent Application No. 2011-087534, filed Apr. 11, 2011, the entire content of which are hereby incorporated by reference.

BACKGROUND OF THE INVENTION

1. Field of the Invention

The present invention relates to an image transmitting/receiving system, an image transmitting apparatus, a received image displaying apparatus, a wireless control apparatus, and an image transmitting/receiving method.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

In recent years, a technology in which a high quality image called high vision is transmitted in a wireless manner between an image source of a DVD deck, an HDD recorder, a set-top box, or a specific image signal generating apparatus for business and a monitor mounted on a wall and the like in a relatively narrow range of a house, an office, and a specific work site has been put to practical use. Furthermore, a distribution method in which reproduction is not disconnected even when a connected device is changed during the streaming distribution of image content has been known (for example, refer to Japanese Unexamined Patent Application, First Publication No. 2010-50930). This represents that connection switching is performed after setting with a device to be connected is performed while performing bi-directional communication.

SUMMARY

The present invention provides an image transmitting/receiving system, an image transmitting apparatus, a received image displaying apparatus, a wireless control apparatus, and an image transmitting/receiving method, by which it is possible to perform the switching of a communication connection without influencing the transmission/reception of an image signal.

According to a first aspect of the present invention, an image transmitting/receiving system may include a plurality of image transmitting apparatuses which continuously wirelessly transmit continuously captured frame images in a captured order and a plurality of received image displaying apparatuses which continuously wirelessly receive the frame images continuously wirelessly transmitted by the plurality of image transmitting apparatuses and continuously display the received frame images in the captured order. The image transmitting apparatus may include: a first wireless communication unit which wirelessly transmits the frame image to the received image displaying apparatus, which has established a wireless communication connection with the image transmitting apparatus, in synchronization with a reference synchronization signal. The received image displaying apparatus includes: a second wireless communication unit which wirelessly receives the frame images transmitted from the image transmitting apparatus having established a wireless communication connection with the received image displaying apparatus; and a display unit which displays the frame images, which have been wirelessly received in the wireless communication unit, in the captured order of the frame images. At least one apparatus of the image transmitting apparatus and the received image displaying apparatus included in the image transmitting/receiving system includes: a reference synchronization signal generation unit which generates a reference synchronization signal; and a control unit which controls the reference synchronization signal generation unit to generate the reference synchronization signal and controls the first wireless communication unit to wirelessly transmit the reference synchronization signal to another apparatus included in the image transmitting/receiving system when the second wireless communication unit does not receive the reference synchronization signal within a constant period. At least one of the image transmitting apparatus and the received image displaying apparatus includes: a blanking interval recognition unit which recognizes a vertical blanking interval of the frame image; and a disconnection control unit which controls the first or second wireless communication unit to start, a disconnection process of wireless communication within a period of the vertical blanking interval recognized by the blanking interval recognition unit.

According to a second aspect of the present invention, in the image transmitting/receiving system of the first aspect, the disconnection control unit provided in the at least one of the image transmitting apparatus and the received image displaying apparatus may control the first or second wireless communication unit not to perform the disconnection process outside of the vertical blanking interval.

According to a third aspect of the present invention, in the image transmitting/receiving system of the first aspect, the blanking interval recognition unit may recognize the vertical blanking interval based on the frame image or the reference synchronization signal.

According to a fourth aspect of the present invention, an image transmitting apparatus in an image transmitting/receiving system may include a plurality of image transmitting apparatuses which continuously wirelessly transmit continuously captured frame images in a captured order and a plurality of received image displaying apparatuses which continuously wirelessly receive the frame images continuously wirelessly transmitted by the plurality of image transmitting apparatuses and continuously display the received frame images in the captured order. The image transmitting apparatus may include: a wireless communication unit which wirelessly transmits the frame image to the received image displaying apparatus, which has established a wireless communication connection with the image transmitting apparatus, in synchronization with a reference synchronization signal; a reference synchronization signal generation unit which generates a reference synchronization signal; a control unit which controls the reference synchronization signal generation unit to generate the reference synchronization signal and controls the wireless communication unit to wirelessly transmit the reference synchronization signal to another apparatus included in the image transmitting/receiving system when the wireless communication unit does not receive the reference synchronization signal within a constant period; a blanking interval recognition unit which recognizes a vertical blanking interval of the frame image; and a disconnection control unit which controls the wireless communication unit to start a disconnection process of wireless communication within a period of the vertical blanking interval recognized by the blanking interval recognition unit.

According to a fifth aspect of the present invention, in the image transmitting apparatus of the fourth aspect the control unit may control the wireless communication unit to transmit the reference synchronization signal within the vertical blanking interval.

According to a sixth aspect of the present invention, the image transmitting apparatus of the fourth aspect may further include a detection unit which detects a plurality of communication channels used when another image transmitting apparatus included in the image transmitting/receiving system wirelessly transmits the frame image. The control unit may control the wireless communication unit to transmit the reference synchronization signal through each communication channel detected by the detection unit.

According to a seventh aspect of the present invention, in the image transmitting apparatus of the sixth aspect when the detection unit detects the plurality of communication channels, the control unit may control the wireless communication unit to transmit the reference synchronization signal through only some of the plurality of communication channels detected by the detection unit, in a single vertical blanking interval.

According to an eighth aspect of the present invention, in the image transmitting apparatus of the seventh aspect, the control unit may control the wireless communication unit to transmit the reference synchronization signal through one of the plurality of communication channels detected by the defection unit, in the single vertical blanking interval.

According to a ninth aspect of the present invention, the image transmitting apparatus of the fourth aspect may further include an instruction receiving unit which receives an instruction for addition, modification, and deletion of a transmission destination of the frame image, and, when the instruction receiving unit receives the instruction, the disconnection control unit may control the wireless communication unit to start the disconnection process.

According to a tenth aspect of the present invention, the image transmitting apparatus of the ninth aspect may further include an operation unit which receives an operation by a user, and the instruction receiving unit may receive the instruction based on the operation received in the operation unit.

According to a eleventh aspect of the present invention, in the image transmitting apparatus of the ninth aspect, the instruction receiving unit may receive the instruction from another apparatus included in the image transmitting/receiving system through the communication unit.

According to a twelfth aspect of the present invention, in the image transmitting apparatus of the fourth aspect the disconnection control unit may control the wireless communication unit not to perform the disconnection process outside of the vertical blanking interval.

According to a thirteenth aspect of the present invention, a received image displaying apparatus in an image transmitting/receiving system may include a plurality of image transmitting apparatuses which continuously wirelessly transmit continuously captured frame images in a captured order and a plurality of received image displaying apparatuses which continuously wirelessly receive the frame images continuously wirelessly transmitted by the plurality of image transmitting apparatuses and continuously display the received frame images in the captured order. The received image displaying apparatus may include: a wireless communication unit which wirelessly receives the frame images from the image transmitting apparatus having established a wireless communication connection with the received image displaying apparatus; a display unit which displays the frame images wirelessly received in the wireless communication unit, in a captured order of the frame images; a reference synchronization signal generation unit which generates a reference synchronization signal; a control unit which controls the reference synchronization signal generation unit to generate the reference synchronization signal and controls the wireless communication unit to wirelessly transmit the reference synchronization signal to another apparatus included in the image transmitting/receiving system when the wireless communication unit does not receive the reference synchronization signal within a constant period; a blanking interval recognition unit which recognizes a vertical blanking interval of the frame image; and a disconnection control unit which controls the wireless communication unit to start a disconnection process of wireless communication within a period of the vertical blanking interval recognized by the blanking interval recognition unit.

According to a fourteenth aspect of the present invention, in the received image displaying apparatus of the thirteenth aspect, the wireless communication unit may wirelessly receive the frame images in a form of packet data, and the reference synchronization signal generation unit may generate the reference synchronization signal based on packet data, which indicates final data of each frame of the frame images, among the packet data wirelessly received in the wireless communication unit.

According to a fifteenth aspect of the present invention, in the received image displaying apparatus of the thirteenth aspect, the control unit may control the wireless communication unit to wirelessly transmit the reference synchronization signal generated by the reference synchronization signal generation unit according to packet data indicating a response for packet data, which indicates final data of each frame of the frame images, among the packet data wirelessly received in the wireless communication unit.

According to a sixteenth aspect of the present invention, in the received image displaying apparatus of the thirteenth aspect, the wireless communication unit may wirelessly receive the frame images in a form of packet data, and the blanking interval recognition unit may recognize the vertical blanking interval of the frame image based on whether the packet data wirelessly received in the wireless communication unit is packet data indicating final data of each frame of the frame images.

According to a seventeenth aspect of the present invention, the received image displaying apparatus of the thirteenth aspect may further include a detection unit which detects a plurality of communication channels used when another image transmitting apparatus included in the image transmitting/receiving system wirelessly transmits the frame image, and the control unit may control the wireless communication unit to transmit the reference synchronization signal through each communication channel detected by the detection unit.

According to a eighteenth aspect of the present invention, in the received image displaying apparatus of the seventeenth aspect, when the detection unit detects the plurality of communication channels, the control unit may control the wireless communication unit to transmit the reference synchronization signal through only some of the plurality of communication channels detected by the detection unit, in a single vertical blanking interval.

According to a nineteenth aspect of the present invention, in the received image displaying apparatus of the eighteenth aspect, the control unit may control the wireless communication unit to transmit the reference synchronization signal through one of the plurality of communication channels detected by the detection unit, in the single vertical blanking interval.

According to a twentieth aspect of the present invention, the received image displaying apparatus of the thirteenth aspect may further include an instruction receiving unit which receives an instruction for addition, modification, and deletion of a transmission destination of the frame image, and, when the instruction receiving unit receives the instruction, the disconnection control unit may control the wireless communication unit to start the disconnection process.

According to a twenty-first aspect of the present invention, the received image displaying apparatus of the twentieth aspect may further include an operation unit which receives an operation by a user, and the instruction receiving unit receives the instruction based on the operation received in the operation unit.

According to a twenty-second aspect of the present invention, in the received image displaying apparatus of the twentieth aspect, the instruction receiving unit may receive the instruction from another apparatus included in the image transmitting/receiving system through the communication unit.

According to a twenty-third aspect of the present invention, in the received image displaying apparatus of the thirteenth aspect, the disconnection control unit may control the wireless communication unit not to perform the disconnection process outside of the vertical blanking interval.

According to a twenty-fourth aspect of the present invention, a wireless control apparatus in an image transmitting/receiving system may include a plurality of image transmitting apparatuses which continuously wirelessly transmit continuously captured frame images in a captured order, a plurality of received image displaying apparatuses which continuously wirelessly receive the frame images continuously wirelessly transmitted by the plurality of image transmitting apparatuses and continuously display the received frame images in the captured order, and the wireless control apparatus which instructs the image transmitting apparatus to wirelessly communicate with the received image displaying apparatus serving as a transmission destination of the frame image and instructs the received image displaying apparatus to wirelessly communicate with the image transmitting apparatus serving as a transmission source of the frame image. The wireless control apparatus may include: a wireless communication unit which wirelessly communicates with the image transmitting apparatus and the received image displaying apparatus; a reference synchronization signal generation unit which generates a reference synchronization signal; and a control unit which controls the reference synchronization signal generation unit to generate the reference synchronization signal and controls the wireless communication unit to wirelessly transmit the reference synchronization signal to another apparatus included in the image transmitting/receiving system when the wireless communication unit does not receive the reference synchronization signal within a constant period.

According to a twenty-fifth aspect of the present invention, the wireless control apparatus of the twenty-fourth aspect may include: an instruction receiving unit which receives an instruction for addition, modification, and deletion of a combination of the apparatus serving as the transmission destination of the frame image and the apparatus serving as the transmission source of the frame image; and a disconnection instruction control unit which controls the wireless communication unit to transmit an instruction for starting a disconnection process of wireless communication to the apparatus of the combination received in the instruction receiving unit when the instruction receiving unit receives the instruction.

According to a twenty-sixth aspect of the present invention, an image transmitting/receiving method in an image transmitting/receiving system may include a plurality of image transmitting apparatuses which continuously wirelessly transmit continuously captured frame images in a captured order and a plurality of received image displaying apparatuses which continuously wirelessly receive the frame images continuously wirelessly transmitted by the plurality of image transmitting apparatuses and continuously display the received frame images in the captured order. The image transmitting/receiving method may include: a wireless transmission step of wirelessly transmitting, by a wireless communication unit of the image transmitting apparatus, the frame image to the received image displaying apparatus, which has established a wireless communication connection with the image transmitting apparatus, in synchronization with a reference synchronization signal; a wireless reception step of wirelessly receiving, by a wireless communication unit of the received image displaying apparatus, the frame image transmitted from the image transmitting apparatus having established a wireless communication connection with the received image displaying apparatus; a display step of displaying, by a display unit of the received image displaying apparatus, the frame images, which have been wirelessly received in the wireless communication unit, in the captured order of the frame images; a reference synchronization signal generation step of generating, by a reference synchronization signal generation unit of at least one of the image transmitting apparatus and the received image displaying apparatus included in the image transmitting/receiving system, a reference synchronization signal; a control step of controlling, by a control unit, of at least one of the image transmitting apparatus and the received image displaying apparatus included in the image transmitting/receiving system, the reference synchronization signal generation unit to generate the reference synchronization signal and controlling the wireless communication unit to wirelessly transmit the reference synchronization signal to another apparatus included in the image transmitting/receiving system when the wireless communication unit does not receive the reference synchronization signal within a constant period; a blanking interval recognition step of recognizing, by a blanking interval recognition unit of at least one of the image transmitting apparatus and the received image displaying apparatus, a vertical blanking interval of the frame image; and a disconnection control step of controlling, by a disconnection control unit of at least one of the image transmitting apparatus and the received image displaying apparatus, the wireless communication unit to start a disconnection process of wireless communication within a period of the vertical blanking interval recognized by the blanking interval recognition unit.

BRIEF DESCRIPTION OF THE DRAWINGS

The above features and advantages of the present invention will be more apparent from the following description of certain preferred embodiments taken in conjunction with the accompanying drawings, in which:

FIG. 6 is a schematic diagram representing an example of a pairing list in accordance with a first preferred embodiment of the present invention.

FIG. 7 is a schematic diagram representing an example of a pairing list in accordance with a first preferred embodiment of the present invention.

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated for explanatory purpose.

First Preferred Embodiment

Hereinafter, a first preferred embodiment of die present invention is described with reference to the accompanying drawings. In the present preferred embodiment, one of image transmitting apparatuses included in an image transmitting/receiving system transmits a reference synchronization signal indicating a transmission timing of an image signal (a frame image) to other image transmitting apparatuses. Then, all image transmitting apparatuses included in the image transmitting/receiving system transmit an image signal based on the reference synchronization signal. In this way, all the image transmitting apparatuses included in the image transmitting/receiving system are able to synchronize a timing at which the image signal is transmitted with a timing (a blanking interval, a vertical blanking interval) at which no image signal is transmitted. Furthermore, in the case of switching a connection destination apparatus, the image transmitting apparatuses and received image displaying apparatuses included in the image transmitting/receiving system perform the transmission/reception of data required in order to switch the connection destination apparatus during the blanking interval. Consequently, it is possible to perform the switching of a communication connection without influencing the transmission/reception of the image signal.

Figure 1:
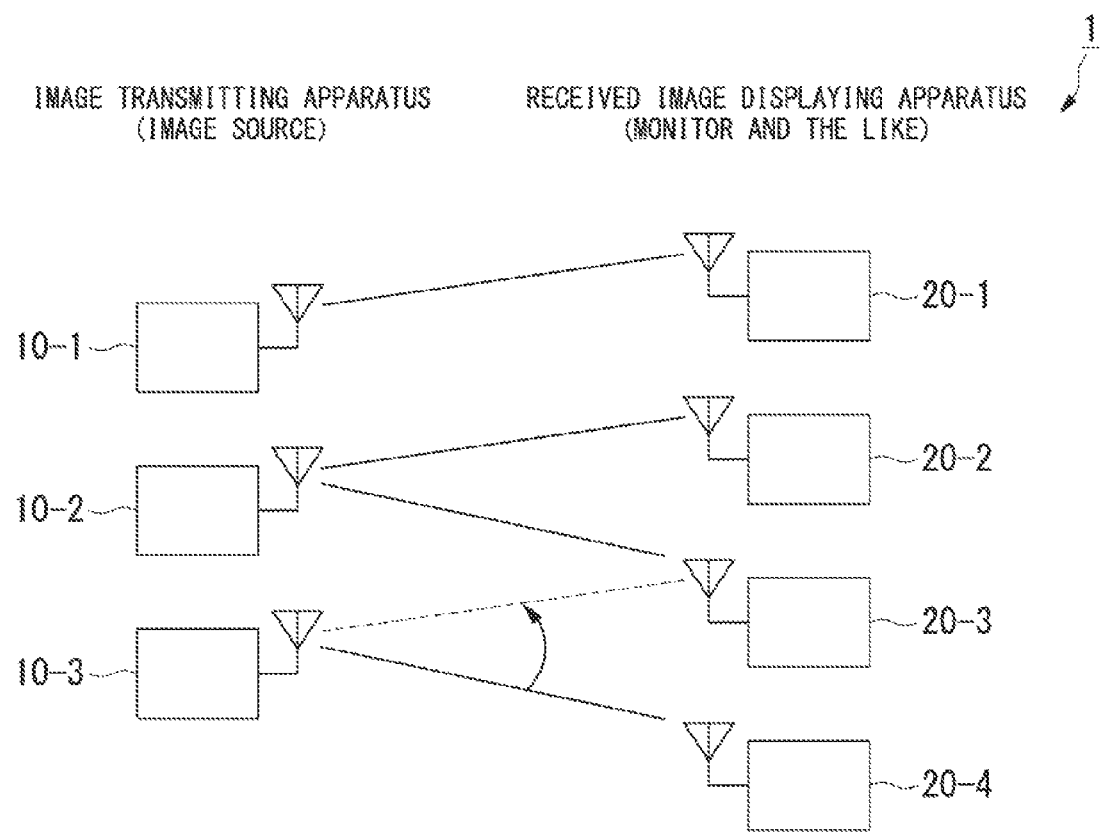
FIG. 1 is a schematic diagram representing the configuration of an image transmitting/receiving system in accordance with a first preferred embodiment of the present invention.

FIG. 1 is a schematic diagram representing the configuration of an image transmitting/receiving system in accordance with the present preferred embodiment. In the illustrated example, an image transmitting/receiving system 1 includes image transmitting apparatuses 10-1 to 10-3 and received image displaying apparatuses 20-1 to 20-4. The image transmitting apparatuses 10-1 to 10-3 are apparatuses that continuously wirelessly transmit continuously captured image signals in a captured order. The received image displaying apparatuses 20-1 to 20-4 are apparatuses that continuously receive the image signals and continuously display the received image signals in the captured order.

Figure 2:
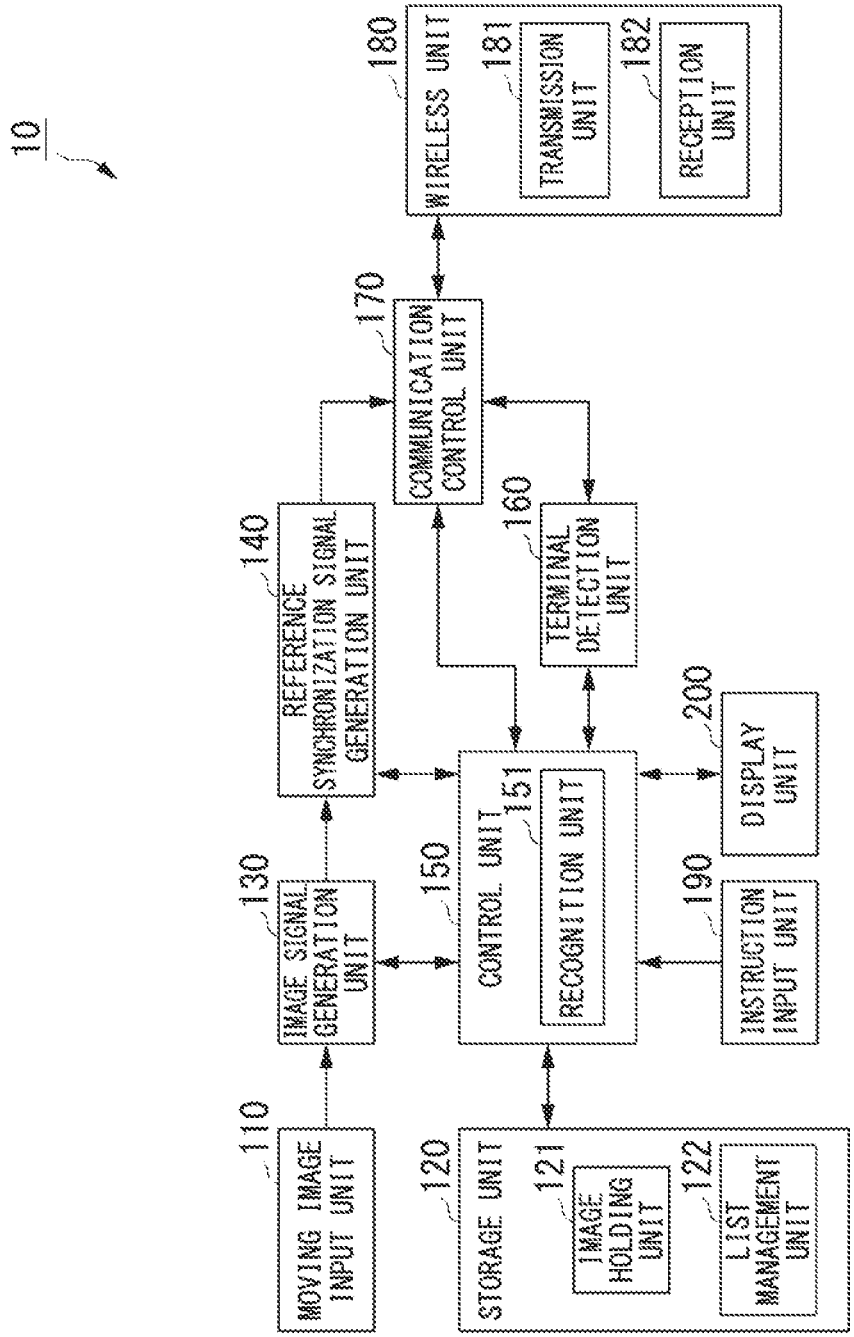
FIG. 2 is a block diagram representing the configuration of an image transmitting apparatus in accordance with a first preferred embodiment of the present invention.

Next, the configuration of the image transmitting apparatus 10 will be described. FIG. 2 is a block diagram representing the configuration of the image transmitting apparatus 10 in accordance with the present preferred embodiment. In the illustrated example, the image transmitting apparatus 10 includes a moving image input unit 110, a storage unit 120, an image signal generation unit 130, a reference synchronization signal generation unit 140, a control unit 150, a terminal detection unit 160, a communication control unit 170 (a disconnection control unit), a wireless unit 180 (a wireless communication unit), an instruction input unit 190 (an operation unit), and a display unit 200.

The moving image input unit 110 receives moving image data to be transmitted. An example of the moving image input unit 110 includes an imaging device including an imaging element such as a CCD (Charged Coupled Device), a moving image recording device such as an HDD (Hard Disk Drive) or DVD (Digital Versatile Disc), and a moving image input means represented by DVI (Digital Visual Interface), HDMI (registered trademark) (High-Definition Multimedia Interface) and the like.

The storage unit 120 includes an image holding unit 121 and a list management unit 122. The image holding unit 121 stores the moving image data input to the moving image input unit 110. The list management unit 122 stores a pairing list indicating combinations of the image transmitting apparatuses 10 and the received image displaying apparatuses 20, which perform communication. The image signal generation unit 130 generates an image signal by converting the moving image data into a format in which a moving image of one frame is generated for each constant time, which is represented by NTSC (National Television System committee). PAL (Phase Alternating Line), or BT656. The reference synchronization signal generation unit 140 generates a reference synchronization signal indicating a transmission timing of an image signal in all the image transmitting apparatuses 10 included in the image transmitting/receiving system 1.

The control unit 150 performs the control of each element provided in the image transmitting apparatuses 10. Furthermore, the control unit 150 includes a recognition unit 151 (a blanking interval recognition unit) that recognizes a timing at which an image signal is transmitted, and a blanking interval which indicates a timing at which control data is transmitted, based on the reference synchronization signal. The terminal detection unit 160 searches for another apparatus included in the image transmitting/receiving system 1. The communication control unit 170 performs the communication control (a baseband process) of an image signal (an image signal packet) or control data (a control packet). The wireless unit 180 includes a transmission unit 181 and a reception unit 182. The transmission unit 181 wirelessly transmits data, such as an image signal or control data, to another apparatus through an antenna (not illustrated). The reception unit 182 wirelessly receives data, which is wirelessly transmitted from another apparatus, through an antenna (not illustrated). The instruction input unit 190 includes a keyboard, a switch and the like, and receives instruction input from a user. The display unit 200 includes a liquid crystal display and the like, and displays various types of information.

In addition, in the present preferred embodiment, in order for the terminal detection unit 160 to detect a terminal, since transmission/reception data is controlled to have no influence on the transmission of an image signal, the wireless unit 180 used in the transmission/reception of an image signal is shared. However, a wireless unit dedicated for the terminal detection unit 160 may be provided.

Figure 3:
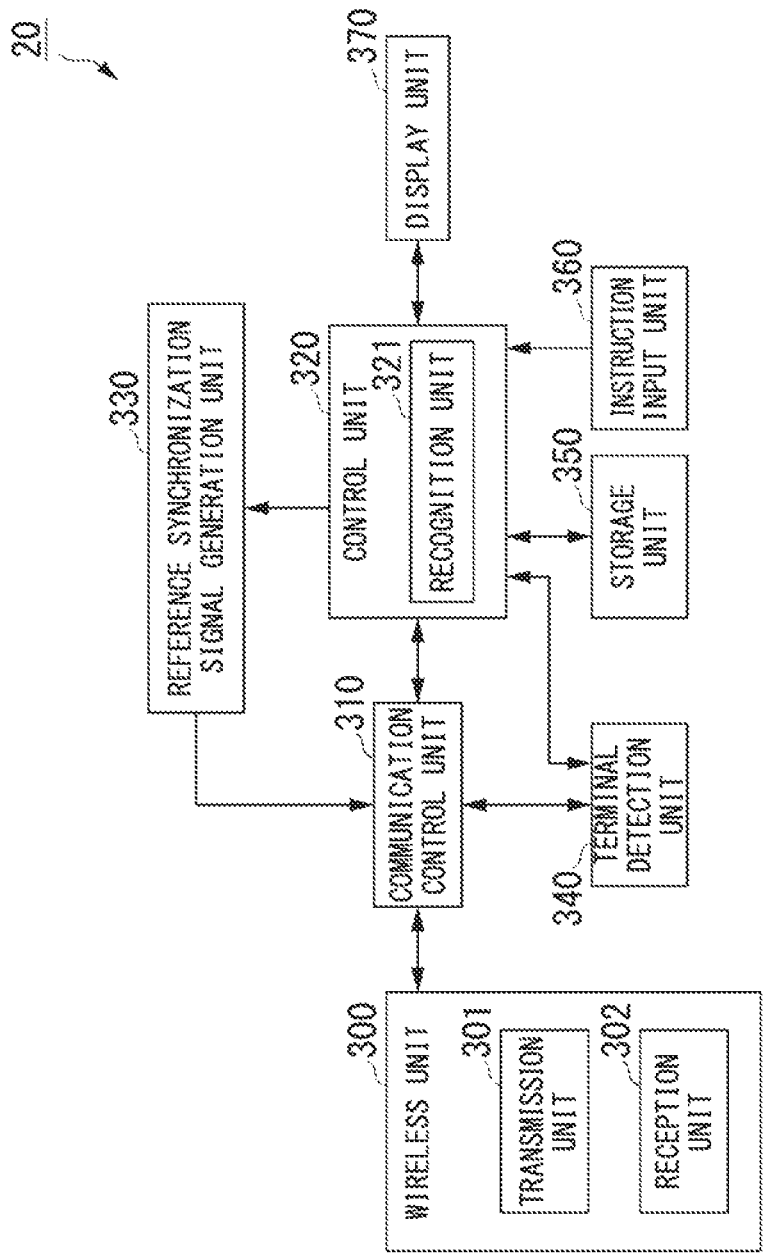
FIG. 3 is a block diagram representing the configuration of a received image displaying apparatus in accordance with a first preferred embodiment of the present invention.

Next, the configuration of the received image displaying apparatus 20 will be described. FIG. 3 is a block diagram representing the configuration of the received image displaying apparatus 20 in accordance with the present preferred embodiment. In the illustrated example, the received image displaying apparatus 20 includes a wireless unit 300 (a wireless communication unit), a communication control unit 310 (a disconnection control unit), a control unit 320, a reference synchronization signal generation unit 330, a terminal detection unit 340, a storage unit 350, an instruction input unit 360, and a display unit 370.

The wireless unit 300 includes a transmission unit 301 and a reception unit 302. The transmission unit 301 wirelessly transmits data to another apparatus through an antenna (not illustrated). The reception unit 302 wirelessly receives data, which is wirelessly transmitted from another apparatus, through an antenna (not illustrated). The communication control unit 310 performs the communication control (a baseband process) of an image signal (an image signal packet) or control data (a control packet). The control unit 320 performs the control of each element provided in the received image displaying apparatus 20. Furthermore, the control unit 320 includes a recognition unit 321 (a blanking interval recognition unit). The recognition unit 321 recognizes a blanking interval indicating a timing at which the control data is transmitted, and further recognizes a final packet in each frame of the image signal received in the reception unit 302. In addition, when the recognition unit 321 recognizes the final packet, the transmission unit 302 has functions of transmitting an ACK signal for the final packet, and transmitting a reference synchronization signal generated by the reference synchronization signal generation unit 330 after transmitting the ACK signal.

The reference synchronization signal generation unit 330 generates a reference synchronization signal indicating a transmission timing of an image signal in all the image transmitting apparatuses 10 included in the image transmitting/receiving system 1. The terminal detection unit 340 searches for another apparatus included in the image transmitting/receiving system 1. The storage unit 350 stores data used in the received image displaying apparatus 20. The instruction input unit 360 includes a keyboard, a switch and the like, and receives instruction input from a user. The display unit 370 includes a liquid crystal display and the like, and displays an image (a moving image) based on an image signal.

Figure 4:
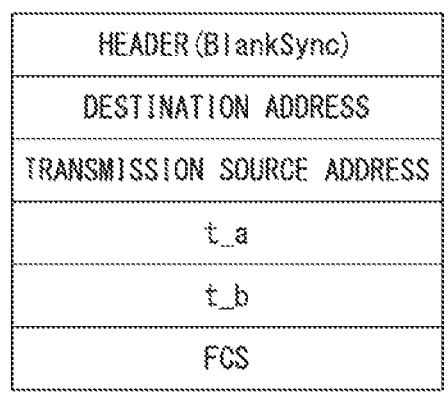
FIG. 4 is a schematic diagram representing the data structure of a reference synchronization signal in accordance with a first preferred embodiment of the present invention.

Next, a data structure of the reference synchronization signal will be described. FIG. 4 is a schematic diagram representing the data structure of the reference synchronization signal in accordance with the present preferred embodiment. In the illustrated example, the reference synchronization signal has data items of a header BlankSync, a destination address, a transmission source address, t_a, t_b, and an FCS (Frame Check Sequence). The header stores data, indicating the reference synchronization signal, and the like. As the destination address, an address of an apparatus to which the reference synchronization signal is transmitted is stored. The destination may be a broadcast address or a multicast address for a specific group. As the transmission source address, an address of a transmission source apparatus of the reference synchronization signal is stored. As the t_a, a period t_a indicating a predetermined period from a start time point of a blanking interval is stored. As the t_b, a period t_b indicating a predetermined period from a time point at which the reference synchronization signal has been transmitted is stored. The FCS stores data for error detection and error correction of the reference synchronization signal.

Figure 5:
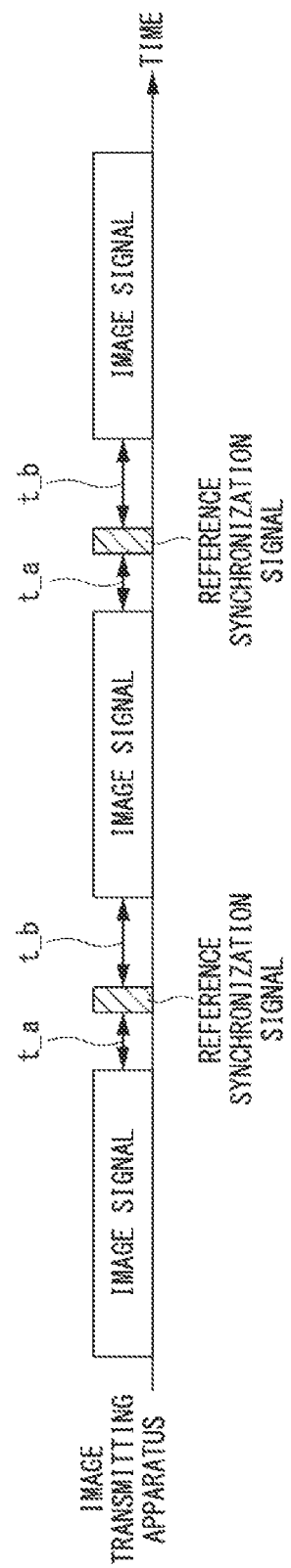
FIG. 5 is a schematic diagram representing timings at which an image transmitting apparatus transmits a reference synchronization signal in accordance with a first preferred embodiment of the present invention.

Next, details of timings at which the image transmitting apparatus 10 transmits the reference synchronization signal will be described. FIG. 5 is a schematic diagram representing timings at which the image transmitting apparatus 10 transmits the reference synchronization signal in accordance with the present preferred embodiment. In addition, a horizontal axis denotes time.

As illustrated in FIG. 5, the image transmitting apparatus 10 transmits the reference synchronization signal at a time point at which the predetermined period t_a has passed from a time point at which a blanking period has started. Furthermore, the image transmitting apparatus 10 waits for a process until the predetermined period t_b passes from the time point at which the reference synchronization signal has been transmitted, and then transmits an image signal of one frame. In addition, the timing at which the image transmitting apparatus 10 transmits the reference synchronization signal, for example, may be positioned immediately after the blanking period has started, or may be within the blanking period. However, the timing at which the image transmitting apparatus 10 transmits the reference synchronization signal is assumed to be a constant timing each time.

In addition, when generating the reference synchronization signal, the reference synchronization signal generation unit 140 stores, in the reference synchronization signal, information on one or both of the period t_a indicating the predetermined period from the time point at which the blanking interval has started and the period t_b indicating the predetermined period from the time point at which the reference synchronization signal has been transmitted. Consequently, an apparatus having received the reference synchronization signal is able to recognize the timing at which the blanking interval starts and the timing at which the blanking interval ends.

Next, the data structure of a pairing list indicating combinations of the image transmitting apparatuses 10 and the received image displaying apparatuses 20 which perform communication will be described. The pairing list may be managed and stored in a unified manner by any apparatus included in the image transmitting/receiving system 1, of managed and stored by each apparatus. In addition, when each apparatus manages and stores the pairing list, all pairing lists need to have the same information.

FIG. 6 is a schematic diagram representing an example of the pairing list in accordance with the present preferred embodiment. In the illustrated example, the pairing list has data items of "ID," "Tx ID," "CH ID," "Rx ID," and "Sync," and stores data of each data item by associating the data in each row.

The data item "ID" stores a number for uniquely specifying a set of data stored in the pairing list. The data item "Tx ID" stores a number for uniquely specifying an image transmitting apparatus 10. The data item "CH ID" stores a number for uniquely specifying a channel used in wireless communication between an image transmitting apparatus 10 uniquely specified by "Tx ID" stored in the same row and a received image displaying apparatus 20 uniquely specified by "Rx ID" stored in the same row. The data item "Rx ID" stores a number for uniquely specifying a received image displaying apparatus 20. The data item "Sync" stores information indicating a communication state between the image transmitting apparatus 10 uniquely specified by the "Tx ID" stored in the same row and the received image displaying apparatus 20 uniquely specified by the "Rx ID" stored in the same row. In addition, when the "Sync" is "OK," it indicates that synchronous transmission is being performed. When the "Sync" is "None," it indicates a non-connection. When the "Sync" is "During," it indicates that synchronization is being set (a connection is currently not possible).

In the illustrated example, a value stored in the data item "ID" of a row 601 is "001," a value stored in the data item "Tx ID" is "0001," a value stored in the data item "CH ID" is "001," a value stored in the data item "Rx ID" is "000.1," and a value stored in the data item "Sync" is "OK." Accordingly, a set of data specified by the ID "001" indicates that an image transmitting apparatus 10 uniquely specified by the Tx ID "0001" and a received image displaying apparatus 20 uniquely specified by the Rx ID "0001" are connected to each other for communication using a channel specified by the CH ID "001," and indicates that synchronous transmission is being performed because the Sync is "OK." Other rows are as illustrated in FIG. 6.

In addition, FIG. 7 illustrates an example of a pairing list when a communication destination of a received image displaying apparatus 20 uniquely specified by the Tx ID "0003" and a received image displaying apparatus 20 uniquely specified by the Tx ID "0004" has changed in the state of the pairing list illustrated in FIG. 6. In the illustrated example, sets of data uniquely specified by the IDs "003" to "005" are different from the example illustrated in FIG. 6. In this way; when a connection state between the image transmitting apparatus 10 and the received image displaying apparatus 20 changes, the pairing list is also updated. In addition, the content indicated by each row is as illustrated in FIG. 7.

Next, an update process of the pairing list will be described. As an example, the case in which, when the image transmitting apparatus 10-2 transmits the reference synchronization signal and manages the consistency of the pairing list, a connection destination of the image transmitting apparatus 10-2 and the image transmitting apparatus 10-3 has changed will be described.

When disconnection and connection processes are generated due to a change in the connection destination, the image transmitting apparatuses 10-2 and 10-3 update pairing lists stored therein. Then, the image transmitting apparatus 10-3, which transmits no reference synchronization signal, transmits update content of the pairing list to the image transmitting apparatus 10-2. The image transmitting apparatus 10-2 having received the update content updates the pairing list stored therein based on the received content, and transmits an updated pairing list to all the image transmitting apparatuses 10 included in the image transmitting/receiving system 1. The image transmitting apparatuses 10 having received the pairing first update pairing lists stored therein based on the received content.

As described above, since the image transmitting apparatus 10-2 managing the consistency of the pairing list is notified of updated content when a communication connection environment of another image transmitting apparatus 10 (or another received image displaying apparatus 20) has been updated as well as when a communication connection environment of the image transmitting apparatus 10-2 has been updated, the image transmitting apparatus 10-2 is able to update the pairing list stored therein. Furthermore, after updating the pairing list, the image transmitting apparatus 10-2 transmits the updated pairing list to all the image transmitting apparatuses if) included in the image transmitting/receiving system 1. In this way, it is possible to maintain the consistency of the pairing lists stored in the image transmitting apparatuses 10 included in the image transmitting/receiving system 1. In addition, since the update process of the pairing list is performed within the blanking interval (in addition, it may not be a blanking interval when the connection environment has been updated), it is possible to perform the process without influencing the transmission/reception of an image signal.

In addition, in order to share the pairing list, the pairing list may be broadcast or multicast to each channel at a predetermined timing during the blanking interval, in this way, the image transmitting apparatuses 10 and the received image displaying apparatuses 20 included in the image transmitting/receiving system 1 are able to receive the pairing list. Furthermore, the predetermined timing is arbitrary. For example, the pairing list is transmitted at a timing of once per second (once every 60 frames in the case of a moving image of 60 frames). Furthermore, the pairing list may also be transmitted in a multicast manner.

Each apparatus included in the image transmitting/receiving system 1 is able to share the pairing list, and an image transmitting apparatus 10 and a received image displaying apparatus 20, which newly perform a connection operation, are able to select a device with which the blanking interval synchronizes. In this way, it is possible to transmit/receive a control signal out of the transmission/reception timings of a moving image, so that it is possible to prevent a collision with the transmission/reception of the moving image.

Figure 8:
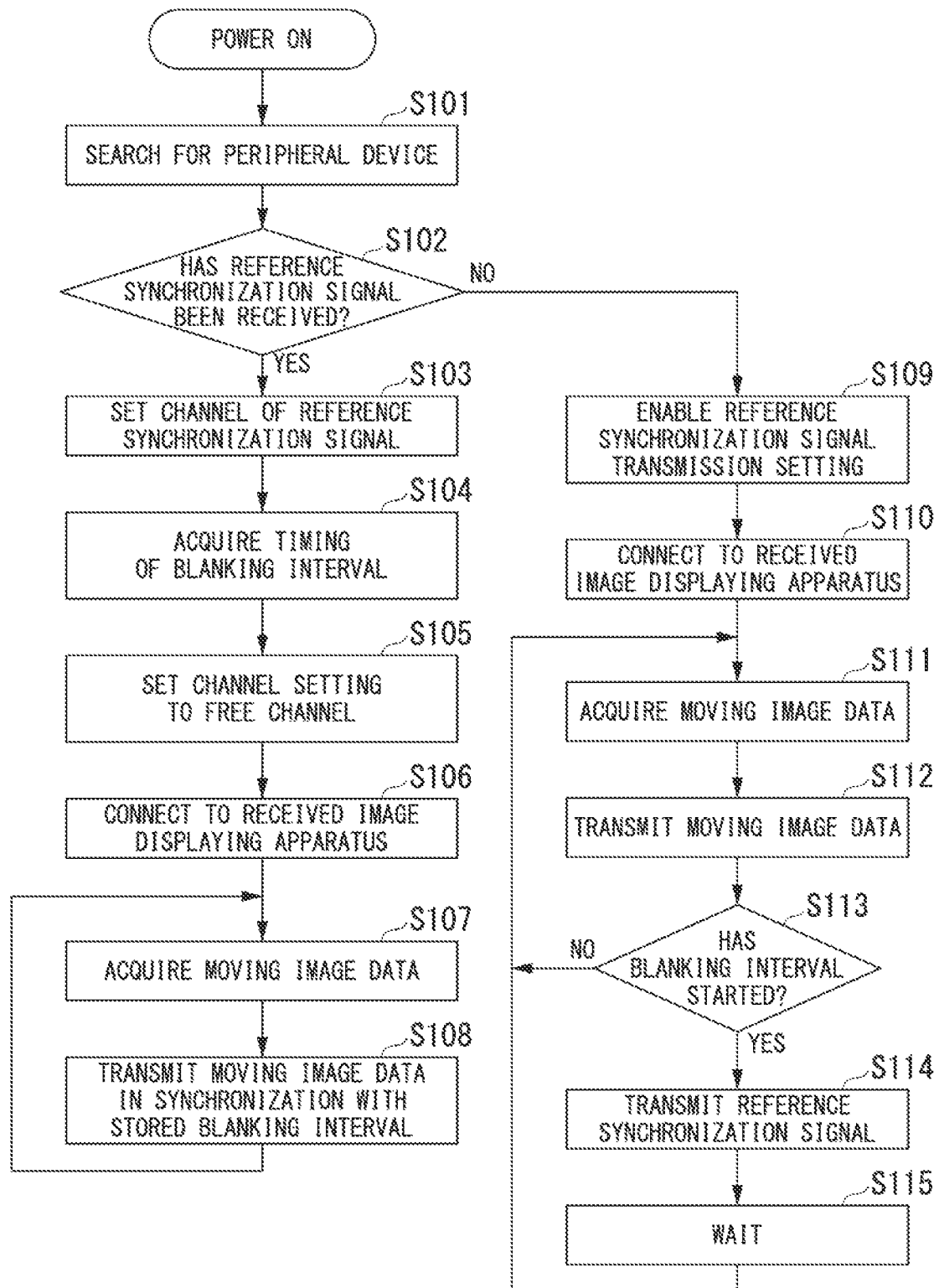
FIG. 8 is a flowchart representing an operation procedure of an image receiving apparatus in accordance with a first preferred embodiment of the present invention.

Next, an operation procedure of the image transmitting apparatus 10 will be described. FIG. 8 is a flowchart illustrating the operation procedure of the image transmitting apparatus 10 in accordance with the present preferred embodiment.

(Step S101) The terminal detection unit 160 searches for another apparatus included in the image transmitting/receiving system 1. Then, the procedure proceeds to a process of step S102.

(Step S102) The recognition unit 151 determines whether a reference synchronization signal transmitted from another apparatus has been received in the reception unit 182 during a constant period. When the recognition unit 151 determines that the reference synchronization signal transmitted from another apparatus has been received in the reception unit 182, the procedure proceeds to a process of step S103. Otherwise, the procedure proceeds to a process of step S109.

(Step S103) The communication control unit 170 matches a reception channel of the reception unit 182 with a channel through which the reference synchronization signal has been transmitted in order to receive the reference synchronization signal. Then, the procedure proceeds to a process of step S104.

(Step S104) The reception unit 182 receives the reference synchronization signal transmitted from another image transmitting apparatus 10. Furthermore, the recognition unit 151 recognizes a timing at which an image signal is transmitted, and a timing of a blanking interval based on the reference synchronization signal received in the reception unit 182. Then, the procedure proceeds to a process of step S105.

(Step S105) The communication control unit 170 changes a channel through which the transmission unit 181 transmits an image signal (an image signal packet) to a free channel. Then, the procedure proceeds to a process of step S106.

(Step S106) The transmission unit 181 performs a communication connection with the received image displaying apparatus 20, which is a communication partner determined in advance, using the channel set in the process of step S105. Then, the procedure proceeds to a process of step S107.

(Step S107) The image signal generation unit 130 generates an image signal of one frame using the moving image data stored in the image holding unit 121. Then, the procedure proceeds to a process of step S108.

(Step S108) The communication control unit 170 allows the image signal of one frame generated by the image signal generation unit 130 in the process of step S107 to synchronize with the timing at which the image signal is transmitted, which has been recognized by the recognition unit 151 in the process of step S104, and transmits the image signal to the received image displaying apparatus 20 having performed the communication connection in the process of step S106. Then, the procedure returns to the process of step S107. In addition, the image signal generation unit 130 and the communication control unit 170 repeat the processes of step S107 and step S108 until the transmission of the image signal is stopped, such as the reception of a transmission stop instruction by the instruction input unit 190.

(Step S109) When the reference synchronization signal has not been received in step S102, the control unit 150 controls the reference synchronization signal generation unit 140 to generate the reference synchronization signal. The reference synchronization signal generation unit 140 generates the reference synchronization signal. In addition, the reference synchronization signal generation unit 140 continuously generates the reference synchronization signal until the image transmitting apparatus 10 is powered off. Then, the procedure proceeds to a process of step S110.

(Step S110) The transmission unit 181 performs a communication connection with the received image displaying apparatus 20, which is a communication partner determined in advance, using a currently set channel. Then, the procedure proceeds to a process of step S111.

(Step S111) The image signal generation unit 130 generates the image signal of one frame using the moving image data stored in the image holding unit 121. Then, the procedure proceeds to a process of step S112.

(Step S112) The communication control unit 170 controls the transmission unit 181 to transmit the image signal of one frame generated by the image signal generation unit 130 in the process of step S111 to the received image displaying apparatus 20 having performed the communication connection in the process of step S110. Then, the procedure proceeds to a process of step S113.

(Step S113) The recognition unit 151 recognizes whether a current time point is a blanking interval based on the reference synchronization signal generated by the reference synchronization signal generation unit 140 in the process of step S109. When the recognition unit 151 recognizes that the current time point is the blanking interval the procedure proceeds to a process of step S114. Otherwise, the procedure returns to the process of step S111.

(Step S114) Since the current time point is the blanking interval, the communication control unit 170 controls the transmission unit 181 to transmit the reference synchronization signal generated by the reference synchronization signal generation unit 140 to other image transmitting apparatuses 10 included in the image transmitting/receiving system 1 in the form of a packet. Then, the procedure proceeds to a process of step S115.

(Step S115) The communication control unit 170 temporarily stops (waits for) a transmission process until the blanking interval ends. After the blanking interval ends, the procedure returns to the process of step S111.

In the case in which the aforementioned processes of step S101 to step S115 are performed, when another apparatus transmits no reference synchronization signal, the image transmitting apparatus 10 is able to generate the reference synchronization signal and transmit the generated reference synchronization signal to other apparatuses in the blanking interval. Furthermore, based on the reference synchronization signal, the oilier apparatuses having received the reference synchronization signal are able to recognize the image signal transmission timing and the blanking interval.

Figure 9:
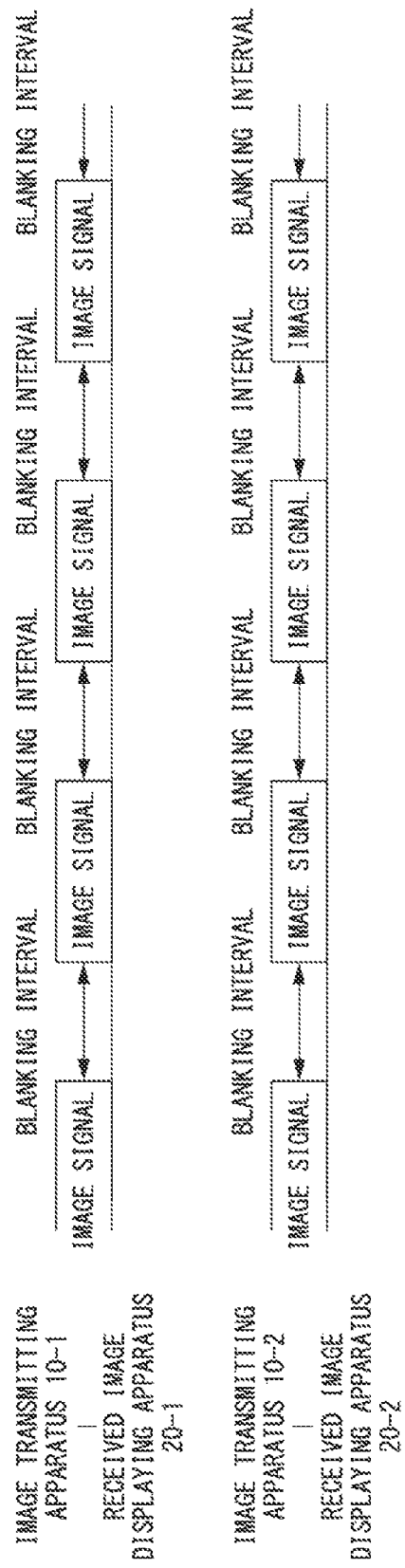
FIG. 9 is a schematic diagram representing image signal transmission timings and blanking intervals in accordance with a first preferred embodiment of the present invention.

FIG. 9 is a schematic diagram representing image signal transmission timings and blanking intervals in accordance with the present preferred embodiment. In addition, a horizontal axis denotes time. In the illustrated example, the image transmitting apparatus 10-1 and the received image displaying apparatus 20-1 perform the transmission/reception of an image signal and the image transmitting apparatus 10-2 and the received image displaying apparatus 20-2 perform the transmission/reception of an image signal. Since the image transmitting apparatus 10-1 and the image transmitting apparatus 10-2 transmit the image signal based on the reference synchronization signal, the timing at which the image transmitting apparatus 10-1 transmits the image signal coincides with the timing at which the image transmitting apparatus 10-2 transmits the image signal. Furthermore, the blanking intervals in the image transmitting apparatus 10-1 and the image transmitting apparatus 10-2 coincide with each other. In addition, all the apparatuses included in the image transmitting/receiving system 1 perform the transmission/reception of the image signal at the illustrated timings at which the image signal is transmitted and at the illustrated timings at which the blanking intervals coincide with each other.

Figure 10:
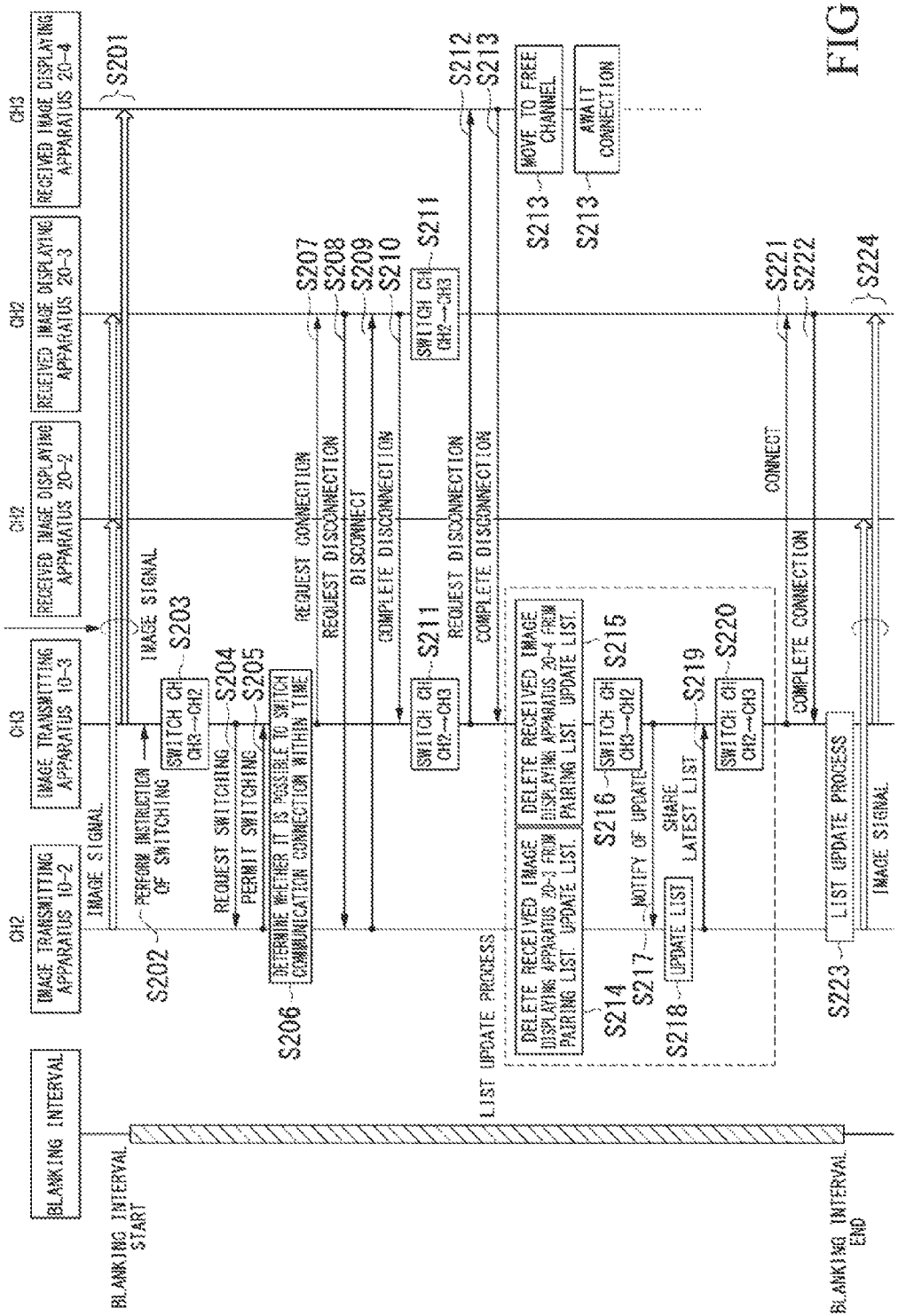
FIG. 10 is a sequence diagram representing an operation procedure when switching a connection between an image transmitting apparatus and a received image displaying apparatus in accordance with a first preferred embodiment of the present invention.

Next, a detailed example when switching a connection between the image transmitting apparatus 10 and the received image displaying apparatus 20 will be described. FIG. 10 is a sequence diagram representing an operation procedure when switching a connection between the image transmitting apparatus 10 and the received image displaying apparatus 20 in accordance with the present preferred embodiment. A vertical axis indicates the passage of time. FIG. 10 illustrates an example of the case in which, when the image transmitting apparatus 10-2 transmits an image signal to the received image displaying apparatuses 20-2 and 20-3 using a communication channel CH2, and the image transmitting apparatus 10-3 transmits an image signal to the received image displaying apparatus 20-4 using a communication channel CH3, a destination to which the image transmitting apparatus 10-3 transmits the image signal is switched to the received image displaying apparatus 20-3.

(Step S201) The image transmitting apparatus 10-2 transmits an image signal to the received image displaying apparatuses 20-2 and 20-3, and the image transmitting apparatus 10-3 transmits an image signal to the received image displaying apparatus 20-4. The image transmitting apparatus 10-2 and the image transmitting apparatus 10-3 transmit the image signals according to the image signal transmission timing based on the reference signal as described above. In addition, in FIG. 10, the timing at which the image transmitting apparatus 10-2 transmits the image signal to the received image displaying apparatuses 20-2 and 20-3 is different from the timing at which the image transmitting apparatus 10-3 transmits the image signal to the received image displaying apparatus 20-4. However, this is for illustrative purposes only, and the image transmitting apparatus 10-2 and the image transmitting apparatus 10-3 actually transmit the image signals at the same timing.

(Step S202) The instruction input unit 190 of the image transmitting apparatus 10-3 receives the input of an instruction for switching a transmission destination of the image signal from the received image displaying apparatus 20-4 to the received image displaying apparatus 20-3.

(Step S203) The image transmitting apparatus 10-3 switches a communication channel from the CH3 to the CH2.

(Step S204) After a blanking interval starts, the image transmitting apparatus 10-3 transmits a switching request message for asking for permission to start communication with the received image displaying apparatus 20-4 to the image transmitting apparatus 10-2.

(Step S205) When the switching request message is received in the process of step S203, the image transmitting apparatus 10-2 determines whether to permit the communication with the received image displaying apparatus 20-4, and transmits a switching permission message to the image transmitting apparatus 10-3 when it is determined to permit the communication.

(Step S206) The image transmitting apparatuses 10-2 and 10-3 determine whether it is possible to switch a communication connection within the blanking interval. When it is determined that it is possible to switch the communication connection within the blanking interval, the image transmitting apparatuses 10-2 and 10-3 perform processes after step S206. When it is determined that it is not possible to switch the communication connection within the blanking interval, the image transmitting apparatuses 10-2 and 10-3 return the CH to the original channel stop a switching process of the communication connection in this blanking interval, and perform the processes after step S206 in the next blanking interval.

(Step S207) The image transmitting apparatus 10-3 transmits a connection request message to the received image displaying apparatus 20-3.

(Step S208) The received image displaying apparatus 20-3 transmits a disconnection request message to the image transmitting apparatus 10-2.

(Step S209) The image transmitting apparatus 10-2 transmits a disconnection message to the received image displaying apparatus 20-3, and then disconnects a communication connection with the received image displaying apparatus 20-3.

(Step S210) The received image displaying apparatus 20-3 disconnects a communication connection with the image transmitting apparatus 10-2, and then transmits a disconnection completion message to the image transmitting apparatus 10-3.

(Step S211) The image transmitting apparatus 10-3 and the received image displaying apparatus 20-3 switch a communication channel from the CH2 to the CH3.

(Step S212) The image transmitting apparatus 10-3 transmits a disconnection request message to the received image displaying apparatus 20-4.

(Step S213) The received image displaying apparatus 20-4 transmits a disconnection completion message and information specifying a channel (a free channel) to be used later by the received image displaying apparatus 20-4 to the image transmitting apparatus 10-3, and then disconnects a communication connection with the image transmitting apparatus 10-3. Then, the received image displaying apparatus 20-4 changes a communication channel to the free channel and waits for a connection.

(Step S214) The image transmitting apparatus 10-2 deletes the received image displaying apparatus 20-3 from the pairing list stored therein, and updates the pairing list.

(Step S215) The image transmitting apparatus 10-2 deletes a combination with the received image displaying apparatus 20-4 from the pairing list stored therein, and updates a communication channel which is stored in the pairing list and used by the received image displaying apparatus 20-4, based on the information received in the process of step S213 and specifying the channel to be used later by the received image displaying apparatus 20-4.

(Step S216) The image transmitting apparatus 10-3 switches a communication channel from the CH3 to the CH2.

(Step S217) The image transmitting apparatus 10-3 transmits the pairing list updated in the process of step S215 to the image transmitting apparatus 10-2.

(Step S218) The image transmitting apparatus 10-2 updates the pairing list stored therein based on the pairing list received in the process of step S217.

(Step S219) The image transmitting apparatus 10-2 transmits the pairing list updated in the process of step S218 to the image transmitting apparatus 10-3. The image transmitting apparatus 10-3 updates the pairing list stored therein based on the received pairing list.

(Step S220) The image transmitting apparatus 10-3 switches a communication channel from the CH2 to the CH3.

(Step S221) The image transmitting apparatus 10-3 starts a communication connection with the received image displaying apparatus 20-3, and then transmits a connection message to the received image displaying apparatus 20-3.

(Step S222) The received image displaying apparatus 20-3 starts a communication connection with the image transmitting apparatus 10-3, and then transmits a connection completion message to the image transmitting apparatus 10-3.

(Step S223) The image transmitting apparatus 10-2 and the image transmitting apparatus 10-3 perform update processes (which are the same as the processes of step S214 to step S220) of the pairing lists.

(Step S224) After the blanking interval ends, the image transmitting apparatus 10-2 transmits the image signal to the received image displaying apparatus 20-2, and the image transmitting apparatus 10-3 transmits the image signal to the received image displaying apparatus 20-3. In addition, in FIG. 10, the timing at which the image transmitting apparatus 10-2 transmits the image signal to the received image displaying apparatus 20-2 is different from the timing at which the image transmitting apparatus 10-3 transmits the image signal to the received image displaying apparatus 20-3. However, this is for illustrative purposes only, and the image transmitting apparatus 10-2 and the image transmitting apparatus 10-3 actually transmit the image signals at the same timing.

In addition, in the aforementioned example, the list update processes (the processes of step S214 to step S220 and the process of step S223) are performed in the blanking interval when the communication switching process has been performed. However, the present invention is not limited thereto. For example, the list update processes may be performed in the blanking interval after that in which the communication switching process has been performed.

As with the aforementioned processes of step S201 to step S224, when switching a connection destination apparatus, the image transmitting apparatuses 10 and the received image displaying apparatuses 20 included in the image transmitting/receiving system 1 perform the transmission/reception of data required in order to switch the connection destination apparatus during the blanking interval. Consequently, it is possible to perform the switching of a communication connection without influencing the transmission/reception of an image signal.

As described above, according to the present preferred embodiment, one of the image transmitting apparatuses 10 included in the image transmitting/receiving system 1 transmits the reference synchronization signal indicating the transmission timing of the image signal to the other image transmitting apparatuses 10. Then, all the image transmitting apparatuses 10 included in the image transmitting/receiving system 1 transmit the image signal based on the reference synchronization signal. In this way, all the image transmitting apparatuses 10 included in the image transmitting/receiving system 1 are able to allow the timing at which the image signal is transmitted to synchronize with the timing (the blanking interval) at which the image signal is not transmitted. Furthermore, when switching a connection destination apparatus, the image transmitting apparatuses 10 and the received image displaying apparatuses 20 included in the image transmitting/receiving system 1 perform the transmission/reception of data required in order to switch the connection destination apparatus during the blanking interval. Consequently, it is possible to perform the switching of a communication connection without influencing the transmission/reception of an image signal.

Second Preferred Embodiment

Next, a second preferred embodiment of the present invention will be described. A difference between the present preferred embodiment and the first preferred embodiment is that the reference synchronization signal is transmitted to all channels in the present preferred embodiment. In addition, an image transmitting/receiving system 1, an image transmitting apparatus 10, and a received image displaying apparatus 20 have the same configurations as those of the image transmitting/receiving system 1, the image transmitting apparatus 10, and the received image displaying apparatus 20 of the first preferred embodiment.

Figure 11:
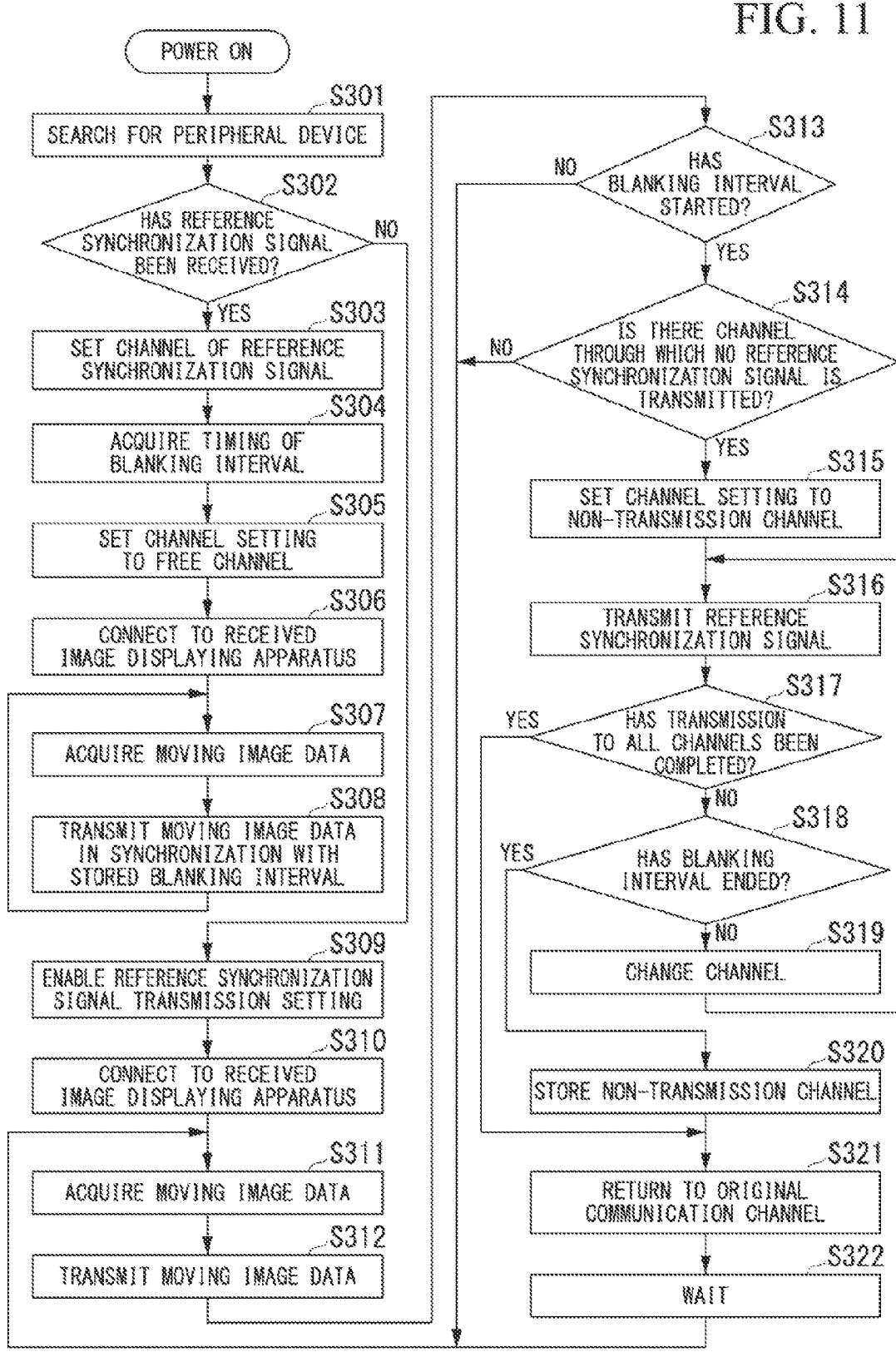
FIG. 11 is a flowchart representing an operation procedure of an image receiving apparatus in accordance with a second preferred embodiment of the present invention.

Next, an operation procedure of the image transmitting apparatus 10 will be described. FIG. 11 is a flowchart illustrating the operation procedure of the image transmitting apparatus 10 in accordance with the present preferred embodiment.

Processes of step S30.1 to step S313 are the same as the processes of step S101 to step S113 in the first preferred embodiment.

(Step S314) The control unit 150 determines whether there is a channel through which the reference synchronization signal is not transmitted. When the control unit 150 determines that there is a channel through which the reference synchronization signal is not transmitted, the procedure proceeds to a process of step S315. When the control unit 150 determines that there is no channel through which the reference synchronization signal is not transmitted, the procedure returns to the process of step S311.

(Step S315) The communication control unit 170 changes a communication channel of the transmission unit 181 to the channel through which the reference synchronization signal is not transmitted. Then, the procedure proceeds to a process of step S316.

(Step S316) The communication control unit 170 controls the transmission unit 181 to transmit the reference synchronization signal generated by the reference synchronization signal generation unit 140 in the form of a packet using the channel set in the process of step S315. Then, the procedure proceeds to a process of step S317.

(Step S317) The control unit 150 determines whether the reference synchronization signal has been transmitted to all channels. When the control unit 150 determines that the reference synchronization signal has been transmitted to all the channels, the procedure proceeds to a process of step S321. Otherwise, the procedure proceeds to the process of step S318.

(Step S318) The recognition unit 151 recognizes whether the blanking interval has ended based on the reference synchronization signal generated by the reference synchronization signal generation unit 140 in the process of step S309. When the recognition unit 151 recognizes that the blanking interval has ended, the procedure proceeds to a process of step S320. Otherwise, the procedure proceeds to the process of step S319.

(Step S319) The communication control unit 170 changes the communication channel of the transmission unit 181 to the channel through which the reference synchronization signal is not transmitted. Then, the procedure returns to the process of step S316.

(Step S320) The control unit 150 allows the channel through which the reference synchronization signal is not transmitted to be stored in the storage unit 120. Then, the procedure proceeds to a process of step S321.

(Step S321) The communication control unit 170 returns the communication channel of the transmission unit 181 to the original channel. Then, the procedure proceeds to a process of step S322.

(Step S322) The communication control unit 170 waits for (temporarily stops) a process until the blanking interval ends. After the blanking interval ends, the procedure returns to the process of step S311.

As described above, according to the present preferred embodiment, one of the image transmitting apparatuses 10 included in the image transmitting/receiving system 1 is able to transmit the reference synchronization signal to all the channels within the blanking interval, in addition, instead of transmitting the reference synchronization signal to all the channels within a single blanking interval, it may be possible to transmit the reference synchronization signal to all the channels over a plurality of blanking intervals or to transmit tire reference synchronization signal only to one channel within the single blanking interval.

Third Preferred Embodiment

Next, a third preferred embodiment of the present invention will be described. A difference between the present preferred embodiment and the first preferred embodiment is that a received image displaying apparatus 20 generates and transmits the reference synchronization signal in the present preferred embodiment. In addition, an image transmitting/receiving system 1, an image transmitting apparatus 10, and the received image displaying apparatus 20 have the same configurations as those of the image transmitting/receiving system 1, the image transmitting apparatus 10, and the received image displaying apparatus 20 of the first preferred embodiment.

Figure 12:
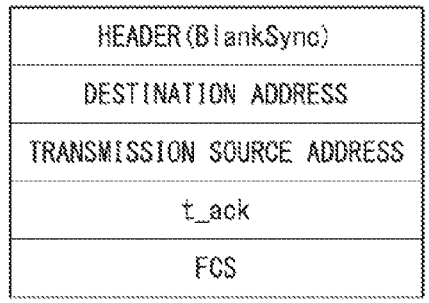
FIG. 12 is a schematic diagram representing the data configuration of a reference synchronization signal in accordance with a third preferred embodiment of the present invention.

Next, a data structure of the reference synchronization signal is described. FIG. 12 is a schematic diagram representing the data structure of the reference synchronization signal in accordance with the present preferred embodiment. In the illustrated example, the reference synchronization signal has data items of a header BlankSync, a destination address, a transmission source address, t_ack, and an FCS (Frame Check Sequence). The header, the destination address, the transmission source address, and the FCS are the same data items as the data items of the first preferred embodiment. As the t_ack, a period t_ack indicating a period until a blanking interval ends is stored.

Figure 13:
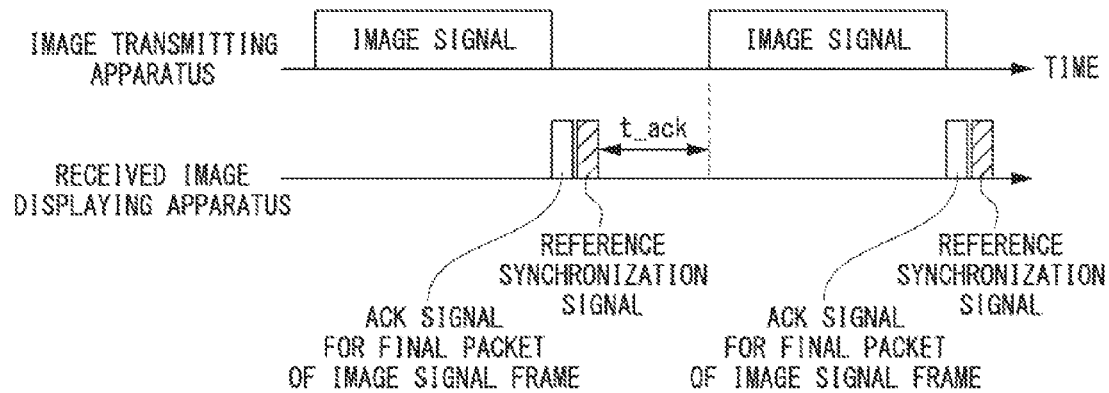
FIG. 13 is a schematic diagram representing timings at which a communication control unit transmits a reference synchronization signal in accordance with a third preferred embodiment of the present invention.

Next, details of timings at which the communication control unit 310 of the received image displaying apparatus 20 transmits the reference synchronization signal will be described. FIG. 13 is a schematic diagram representing timings at which the communication control unit 310 transmits the reference synchronization signal in accordance with the present preferred embodiment. In addition, a horizontal axis denotes time.

As illustrated in FIG. 13, the communication control unit 310 transmits an ACK signal for a final packet of an image signal frame to the image transmitting apparatus 10, and then transmits the reference synchronization signal. In addition, according to a method for determining the final packet of the image signal frame, for example, when data amounts of frames received in the received image displaying apparatus 20 are accumulated and reach an image data amount of one frame, it is determined as the final packet of the image signal.

In addition, as described above, the reference synchronization signal includes the period t_ack until the blanking interval ends. Thus, the image transmitting apparatus 10 having received the reference synchronization signal starts to transmit an image signal frame after the passage of the period t_ack until the blanking interval ends, so that it is possible to achieve synchronization of blank intervals and image signal transmission timings among all the image transmitting apparatuses 10 included in the image transmitting/receiving system 1.

Figure 14:
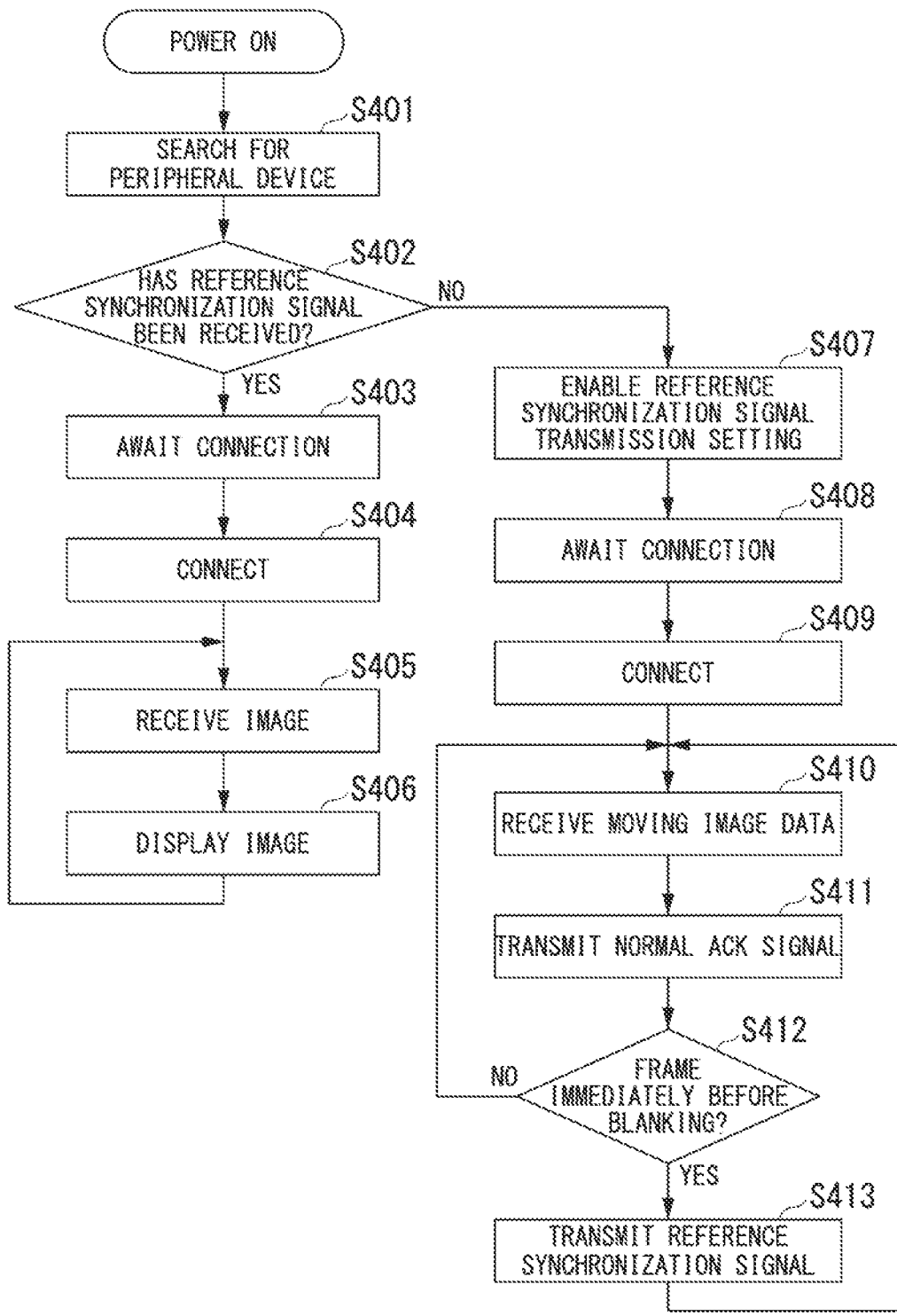
FIG. 14 is a flowchart representing an operation procedure of a received image displaying apparatus in accordance with a third preferred embodiment of the present invention.

Next, an operation procedure of the received image displaying apparatus 20 will be described. FIG. 14 is a flowchart illustrating the operation procedure of the received image displaying apparatus 20 in accordance with the present preferred embodiment.

(Step S401) The terminal detection unit 340 searches for another apparatus included in the image transmitting/receiving system 1. Then, the procedure proceeds to a process of step S402.

(Step S402) The recognition unit 321 determines whether a reference synchronization signal transmitted from another apparatus has been received in the reception unit 302 during a constant period. When the recognition unit 321 determines that the reference synchronization signal transmitted from another apparatus has been received in the reception unit 302, the procedure proceeds to a process of step S403. Otherwise, the procedure proceeds to a process of step S407.

(Step S403) The communication control unit 310 waits until an image transmitting apparatuses 10 is connected. When the image transmitting apparatuses 10 is connected, the procedure proceeds to a process of step S404.

(Step S404) The reception unit 302 performs a communication connection with the image transmitting apparatuses 10 connected in the process of step S403. Then, the procedure proceeds to a process of step S405.

(Step S405) The reception unit 302 receives an image signal transmitted from the image transmitting apparatuses 10 for which the communication connection has been performed in the process of step S404. Then, the procedure proceeds to a process of step S406.

(Step S406) The display unit 370 displays a moving image based on the image signal received in the reception unit 302 in the process of step S405. Then, the procedure returns to the process of step S405. In addition, the reception unit 302 and the display unit 370 repeat the processes of step S405 and step S406 until the reception of the image signal is stopped, such as the reception of a reception stop instruction by the instruction input unit 190.

(Step S407) The control unit 320 allows the reference synchronization signal generation unit 330 to generate the reference synchronization signal. The reference synchronization signal generation unit 330 generates the reference synchronization signal. In addition, the reference synchronization signal generation unit 330 continuously generates the reference synchronization signal until the received image displaying apparatus 20 is powered off. Then, the procedure proceeds to a process of step 408.

(Step S408) The communication control unit 310 waits until an image transmitting apparatus 10 is connected. When the image transmitting apparatus 10 is connected, the procedure proceeds to a process of step S409.

(Step S409) The reception unit 302 performs a communication connection with the image transmitting apparatus 10 connected in the process of step S408. Then, the procedure proceeds to a process of step S410.

(Step S410) The reception unit 302 receives a frame of an image signal transmitted from the image transmitting apparatus 10 for which the communication connection has been performed in the process of step S409. Then, the procedure proceeds to a process of step S411.

(Step S411) The transmission unit 301 transmits ACK. Then, the procedure proceeds to a process of step 412

(Step S412) The recognition unit 321 recognizes whether the frame of the image signal received in the reception unit 302 in the process of step S410 is a frame immediately before a blanking interval. When the recognition unit 321 recognizes that the frame received in the reception unit 302 in the process of step S410 is the frame immediately before the blanking interval, the procedure proceeds to a process of step S413. Otherwise, the procedure returns to the process of step S410.

(Step S413) The communication control unit 310 controls the transmission unit 301 to transmit the reference synchronization signal generated by the reference synchronization signal generation unit 330 to other image transmitting apparatuses 10 and other received image displaying apparatuses 20 included in the image transmitting/receiving system 1 in the form of a packet. Then, the procedure returns to the process of step S410.

In the case in which the aforementioned processes of step S401 to step S413 are performed, when another apparatus transmits no reference synchronization signal, the received image displaying apparatus 20 is able to generate the reference synchronization signal and transmit the generated reference synchronization signal to other apparatuses in the blanking interval. Furthermore, the other apparatuses having received the reference synchronization signal are able to recognize the image signal transmission timing and the blanking interval based on the reference synchronization signal.

Figure 15:
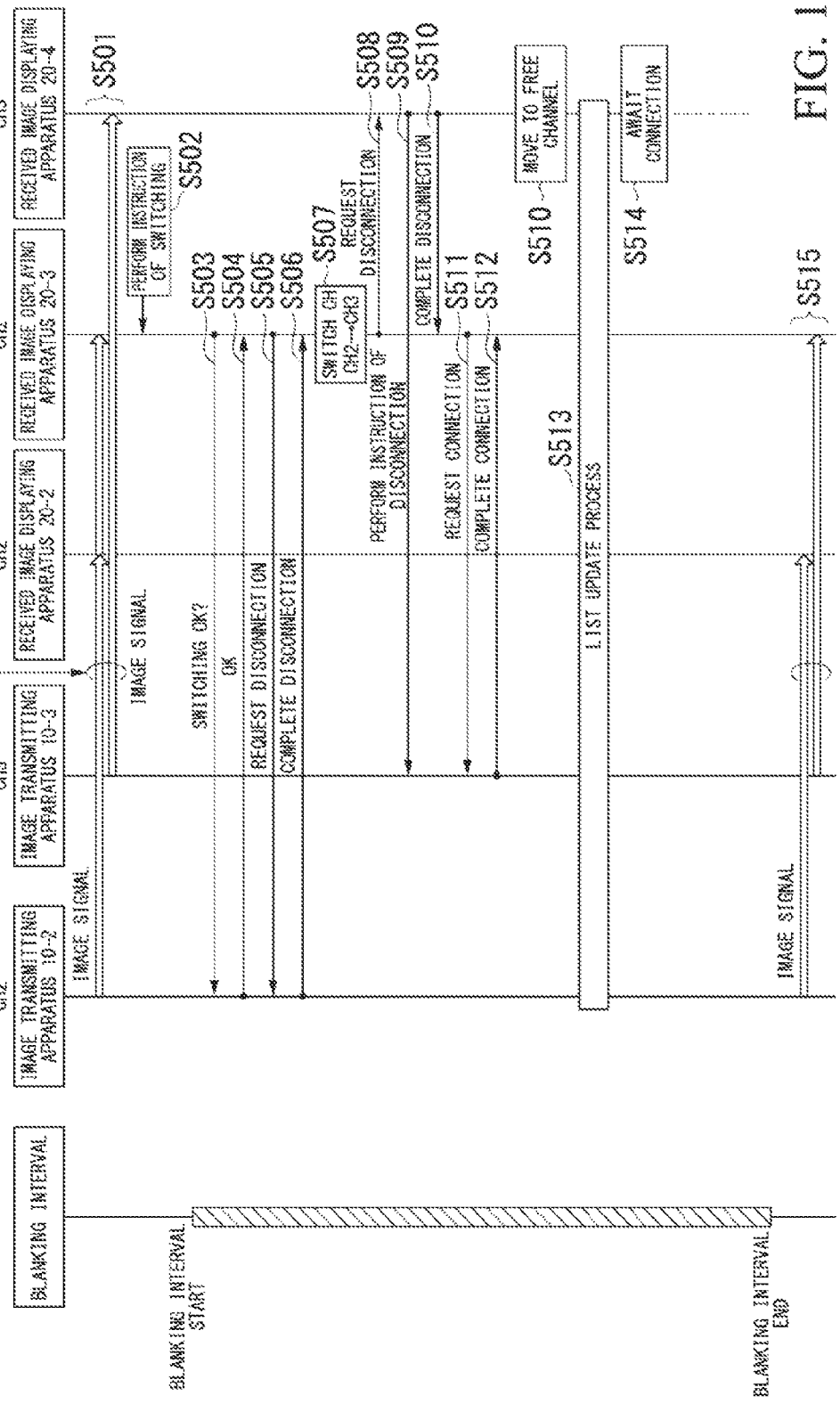
FIG. 15 is a sequence diagram representing an operation procedure when switching a connection between an image transmitting apparatus and a received image displaying apparatus in accordance with a third preferred embodiment of the present invention.

Next, a detailed example when switching a connection between the image transmitting apparatus 10 and the received image displaying apparatus 20 will be described. FIG. 15 is a sequence diagram representing an operation procedure when switching a connection between the image transmitting apparatus 10 and the received image displaying apparatus 20 in accordance with the present preferred embodiment. A vertical axis indicates the passage of time. FIG. 15 illustrates a detailed example of the case in which, when the image transmitting apparatus 10-2 transmits an image signal to the received image displaying apparatuses 20-2 and 20-3 using a communication channel CH2, and the image transmitting apparatus 10-3 transmits an image signal to the received image displaying apparatus 20-4 using a communication channel CH3, a destination from which the received image displaying apparatus 20-3 receives the image signal is switched to the image transmitting apparatus 10-3.

(Step S501) The image transmitting apparatus 10-2 transmits an image signal to the received image displaying apparatuses 20-2 and 20-3, and the image transmitting apparatus 10-3 transmits an image signal to the received image displaying apparatus 20-4. The image transmitting apparatus 10-2 and the image transmitting apparatus 10-3 transmit tire image signals according to the image signal transmission timing based on the reference signal as described above. In addition, in FIG. 15, the timing at which the image transmitting apparatus 10-2 transmits the image signal to the received image displaying apparatuses 20-2 and 20-3 is different from the timing at which the image transmitting apparatus 10-3 transmits the image signal to the received image displaying apparatus 20-4. However, this is for illustrative purposes only, and the image transmitting apparatus 10-2 and the image transmitting apparatus 10-3 actually transmit the image signals at tire same timing.

(Step S502) The instruction input unit 360 of the received image displaying apparatus 20-3 receives the input of an instruction for switching a reception destination of the image signal from the image transmitting apparatus 10-2 to the image transmitting apparatus 10-3.

(Step S503) After a blanking interval starts, the received image displaying apparatus 20-3 transmits a switching confirmation message for asking permission to start communication with the image transmitting apparatus 10-3 to the image transmitting apparatus 10-2.

(Step S504) When the switching confirmation message is received, in the process of step S503, the image transmitting apparatus 10-2 determines whether to permit the communication with the image transmitting apparatus 10-3, and transmits a switching permission message to the received image displaying apparatus 20-3 when it is determined to permit the communication.

(Step S505) The received image displaying apparatus 20-3 transmits a disconnection request message to the image transmitting apparatus 10-2.

(Step S506) The image transmitting apparatus 10-2 transmits a disconnection completion message to the received image displaying apparatus 20-3, and then disconnects a communication connection with the received image displaying apparatus 20-3.

(Step S507) The received image displaying apparatus 20-3 disconnects a communication connection with the image transmitting apparatus 10-2, and then switches a communication channel from the CH2 to the CH3.

(Step S508) The received image displaying apparatus 20-3 transmits a disconnection request message to the received image displaying apparatus 20-4.

(Step S509) The received image displaying apparatus 20-4 transmits a disconnection instruction message to the image transmitting apparatus 10-3, and then disconnects a communication connection with the image transmitting apparatus 10-3.

(Step S510) The received image displaying apparatus 20-4 transmits a disconnection completion message and information specifying a channel (a free channel) to be used later by the received image displaying apparatus 20-4 to the received image displaying apparatus 20-3, and then disconnects a communication connection with the image transmitting apparatus 10-3. Then, the received image displaying apparatus 20-4 changes a communication channel to the free channel.

(Step S511) The received image displaying apparatus 20-3 transmits a connection request message to the image transmitting apparatus 10-3.

(Step S512) After starting a communication connection with the received image displaying apparatus 20-3, the image transmitting apparatus 10-3 transmits a connection completion message to the received image displaying apparatus 20-3.

(Step S513) The image transmitting apparatuses 10-2 and 10-3 and the received image displaying apparatuses 20-1, 20-2, and 20-3 perform update processes of pairing lists. In addition, the update processes of the pairing lists are the same as the update processes of the pairing lists in the first preferred embodiment.

(Step S514) The received image displaying apparatus 20-4 waits for a connection.

(Step S515) After the blanking interval ends, the image transmitting apparatus 10-2 transmits the image signal to the received image displaying apparatus 20-2, and the image transmitting apparatus 10-3 transmits the image signal to the received image displaying apparatus 20-3. In addition, in FIG. 15, the timing at which the image transmitting apparatus 10-2 transmits the image signal to the received image displaying apparatus 20-2 is different from the timing at which the image transmitting apparatus 10-3 transmits the image signal to the received image displaying apparatus 20-3. However, this is for illustrative purposes only, and the image transmitting apparatus 10-2 and the image transmitting apparatus 10-3 actually transmit the image signals at the same timing.

As with the aforementioned processes of step S501 to step S515, when switching a connection destination apparatus, the image transmitting apparatuses 10 and the received image displaying apparatuses 20 included in the image transmitting/receiving system 1 perform the transmission/reception of data required in order to switch the connection destination apparatus during the blanking interval. Consequently, it is possible to perform the switching of a communication connection without influencing the transmission/reception of an image signal.

As described above, according to the present preferred embodiment, one of the received image displaying apparatuses 20 included in the image transmitting/receiving system 1 transmits the reference synchronization signal indicating the transmission timing of the image signal to the other received image displaying apparatuses 20 and the other image transmitting apparatuses 10. Then, all the image transmitting apparatuses 10 included in the image transmitting/receiving system 1 transmit the image signal based on the reference synchronization signal. In this way, all the image transmitting apparatuses 10 included in the image transmitting/receiving system 1 are able to allow the timing at which the image signal is transmitted to synchronize with the timing (the blanking interval) at which the image signal is not transmitted. Furthermore, when switching a connection destination apparatus, the image transmitting apparatuses 10 and the received image displaying apparatuses 20 included in the image transmitting/receiving system 1 perform the transmission/reception of data required in order to switch the connection destination apparatus during the blanking interval. Consequently, it is possible to perform the switching of a communication connection without influencing the transmission/reception of an image signal.

Fourth Preferred Embodiment

Next, a fourth preferred embodiment of the present invention will be described. A difference between the present preferred embodiment and the third preferred embodiment is that the reference synchronization signal is transmitted to all channels in the present preferred embodiment. In addition, an image transmitting/receiving system 1, an image transmitting apparatus 10, and a received image displaying apparatus 20 have the same configurations as those of the image transmitting/receiving system 1, the image transmitting apparatus 10, and the received image displaying apparatus 20 of the third preferred embodiment.

Figure 16:
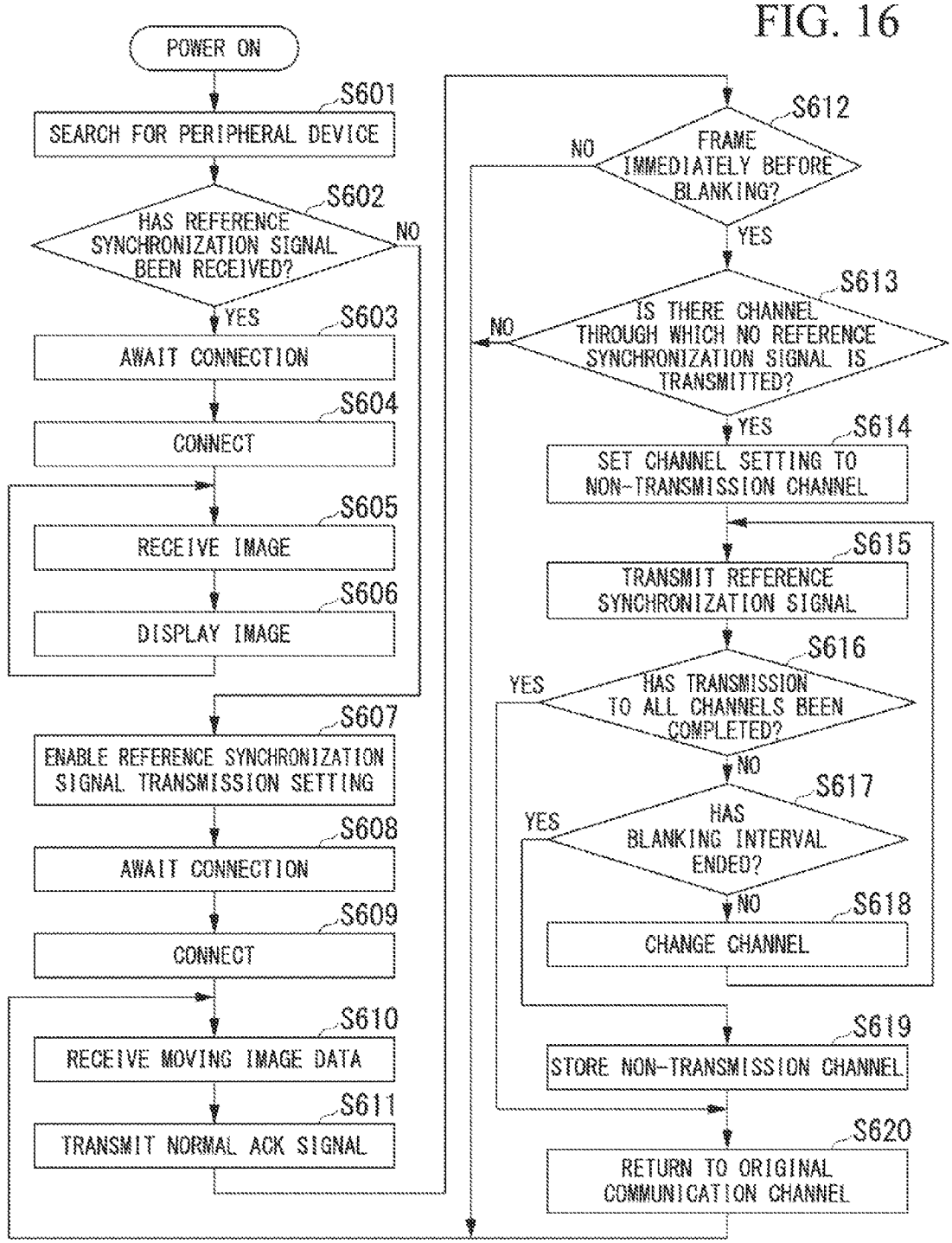
FIG. 16 is a flowchart representing an operation procedure of an image receiving apparatus in accordance with a fourth preferred embodiment of the present invention.

Next, an operation procedure of the received image displaying apparatus 20 will be described. FIG. 16 is a flowchart illustrating the operation procedure of the image transmitting apparatus 10 in accordance with the present preferred embodiment.

Processes of step S601 to step S6.12 are the same as the processes of step S401 to step S412 in the third preferred embodiment.

(Step S613) The control unit 320 determines whether there is a channel through which the reference synchronization signal is not transmitted. When the control unit 320 determines that there is a channel through which the reference synchronization signal is not transmitted, the procedure proceeds to a process of step S6.14. When the control unit 320 determines that there is no channel through which the reference synchronization signal is not transmitted, the procedure returns to the process of step S6.10.

(Step S614) The communication control unit 310 changes a communication channel of the transmission unit 301 to the channel through which the reference synchronization signal is not transmitted. Then, the procedure proceeds to a process of step S615.

(Step S615) The communication control unit 310 controls the transmission unit 301 to transmit the reference synchronization signal generated by the reference synchronization signal generation unit 330 in the form of a packet using the channel set in the process of step S614. Then, the procedure proceeds to a process of step S616.

(Step S616) The control unit 320 determines whether the reference synchronization signal has been transmitted to all channels. When the control unit 320 determines that the reference synchronization signal has been transmitted to all the channels, the procedure proceeds to a process of step S620. Otherwise, the procedure proceeds to a process of step S617.

(Step S617) The recognition unit 321 recognizes whether the blanking interval has ended based on the reference synchronization signal generated by the reference synchronization signal generation unit 330. When the recognition unit 321 recognizes that the blanking interval has ended, the procedure proceeds to a process of step S619. Otherwise, the procedure proceeds to a process of step S618.

(Step S618) The communication control unit 310 changes the communication channel of the transmission unit 301 to the channel through which the reference synchronization signal is not transmitted. Then, the procedure returns to the process of step S615.

(Step S619) The control unit 320 allows the channel through which the reference synchronization signal is not transmitted to be stored in the storage unit 350. Then, the procedure proceeds to a process of step S620.

(Step S620) The communication control unit 310 returns die communication channel of the transmission unit 301 to the original channel. Then, the procedure returns to the process of step S610.

As described above, according to the present preferred embodiment, one of the received image displaying apparatuses 20 included in the image transmitting/receiving system 1 is able to transmit the reference synchronization signal to all the channels within the blanking interval. In addition, instead of transmitting the reference synchronization signal to all the channels within a single blanking interval, it may be possible to transmit the reference synchronization signal to all the channels over a plurality of blanking intervals or to transmit the reference synchronization signal only to one channel within the single blanking interval.

Fifth Preferred Embodiment

Figure 17:
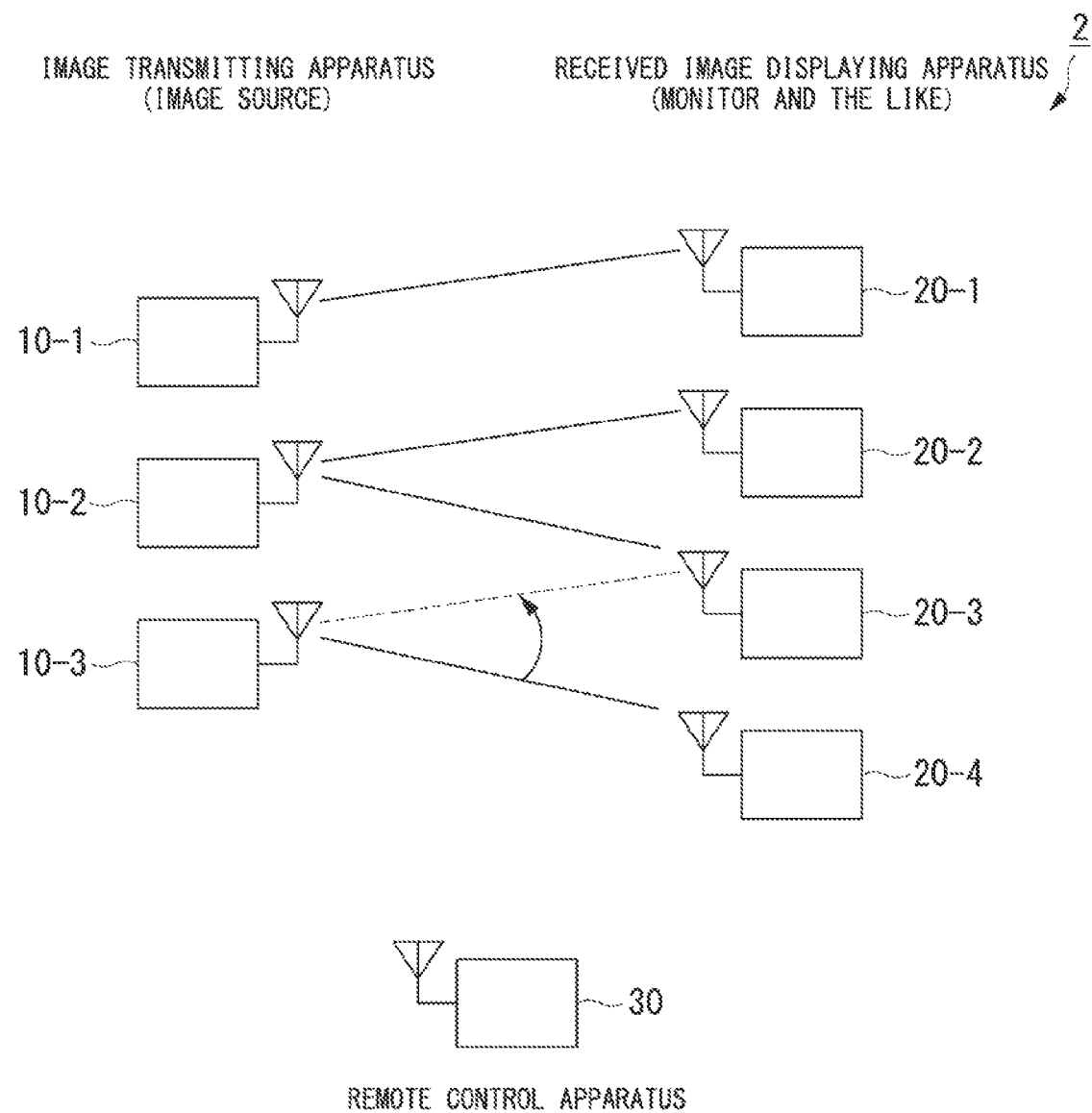
FIG. 17 is a schematic diagram representing the configuration of an image transmitting/receiving system in accordance with a fifth preferred embodiment of the present invention.

Next, a fifth preferred embodiment of the present invention will be described with reference to the accompanying drawings. FIG. 17 is a schematic diagram representing the configuration of an image transmitting/receiving system in accordance with the present preferred embodiment. In the illustrated example, an image transmitting/receiving system 2 includes image transmitting apparatuses 10-1 to 10-3, received image displaying apparatuses 20-1 to 20-4, and a remote control apparatus 30. In addition, the image transmitting apparatus 10 and the received image displaying apparatus 20 have the same configurations as those of the image transmitting apparatus 10 and the received image displaying apparatus 20 of the first preferred embodiment. The remote control apparatus 30 receives the input of an instruction from a user, and transmits an instruction to other apparatuses included in the image transmitting/receiving system 2 based on the received instruction.

Figure 18:
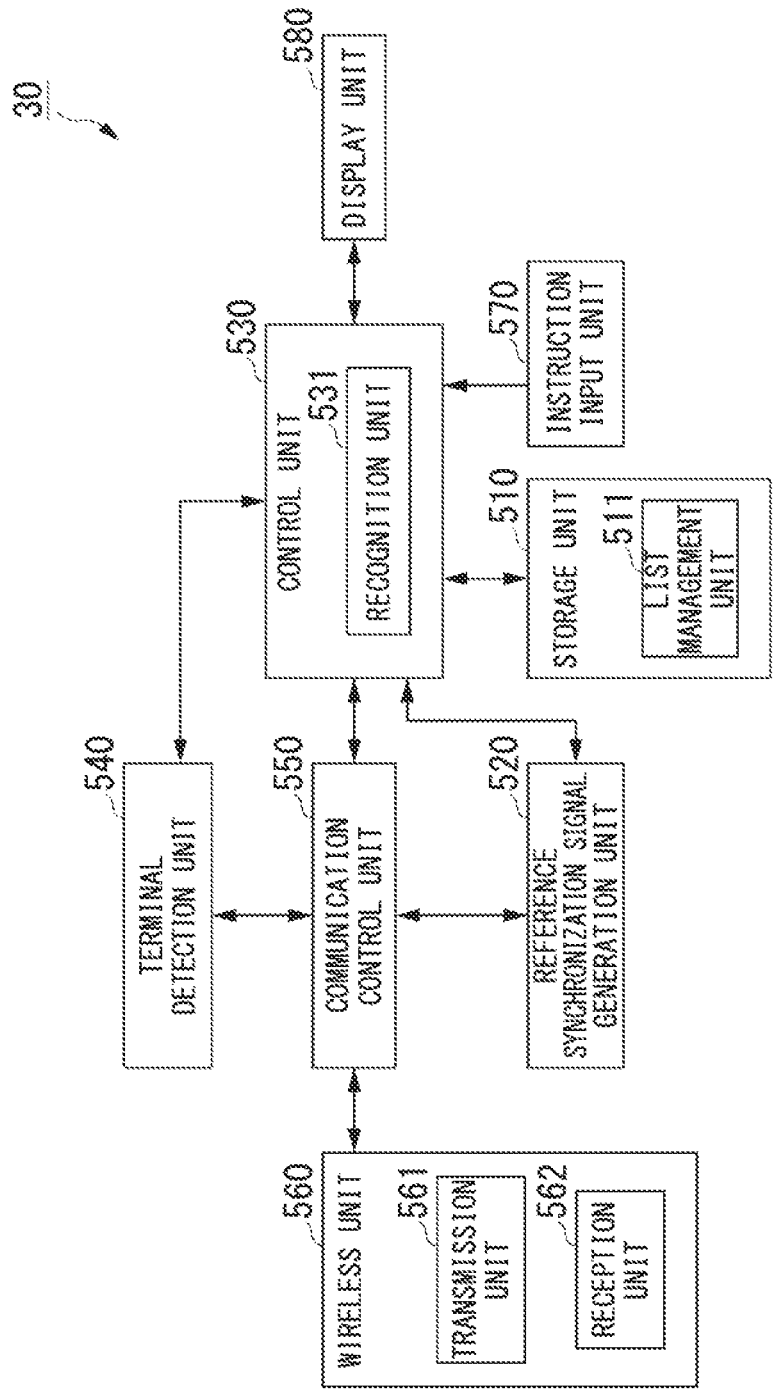
FIG. 18 is a block diagram representing the configuration of a remote control apparatus in accordance with a fifth preferred embodiment of the present invention.

Next, the configuration of the remote control apparatus 30 will be described. FIG. 18 is a block diagram representing the configuration of the remote control apparatus 30 in accordance with the present preferred embodiment. In the illustrated example, the remote control apparatus 30 includes a storage unit 510, a reference synchronization signal generation unit 520, a control unit 530, a terminal detection unit 540, a communication control unit 550, a wireless unit 560 (a wireless communication unit), an instruction input unit 570, and a display unit 580.

The storage unit 510 includes a list management unit 511. The list management unit 511 stores a pairing list indicating combinations of the image transmitting apparatuses 10 and the received image displaying apparatuses 20, which perform communication. The reference synchronization signal generation unit 520 generates a reference synchronization signal indicating a transmission timing of an image signal in all the image transmitting apparatuses 10 included in the image transmitting/receiving system 2. The control unit 530 performs the control of each element provided in the remote control apparatus 30. Furthermore, the control unit 530 includes a recognition unit 531 that recognizes a timing at which an image signal is transmitted, and a blanking interval, which indicates a timing at which control data is transmitted, based on the reference synchronization signal.

The terminal detection unit 540 searches for another apparatus included in the image transmitting/receiving system 2. The communication control unit 550 performs the communication control (a baseband process). The wireless unit 560 includes a transmission unit 561 and a reception unit 562. The transmission, unit 561 wirelessly transmits data to another apparatus through an antenna (not illustrated). The reception unit 562 wirelessly receives data wirelessly transmitted from another apparatus through an antenna (not illustrated). The instruction input unit 570 includes a keyboard, a switch and the like, and receives instruction input from a user. The display unit 580 includes a liquid crystal display and the like, and displays various types of information.

Figure 19:
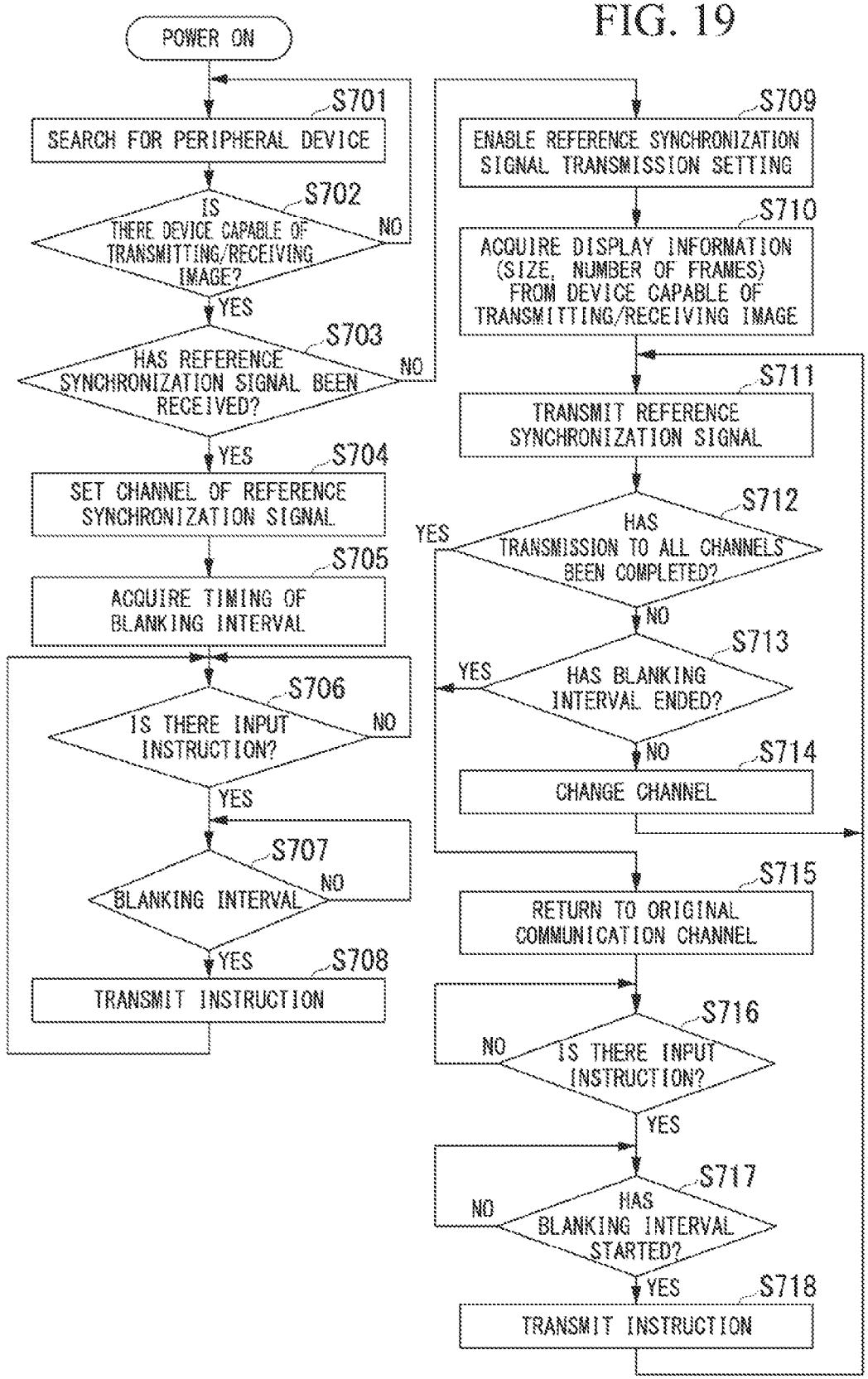
FIG. 19 is a flowchart representing an operation procedure of a remote control apparatus in accordance with a fifth preferred embodiment of the present invention.

Next, an operation procedure of the remote control apparatus 30 will be described, FIG. 19 is a flowchart illustrating the operation procedure of the remote control apparatus 30 in accordance with the present preferred embodiment.

(Step S701) The terminal detection unit 540 searches for another apparatus included in the image transmitting/receiving system 2. Then, the procedure proceeds to a process of step S702.

(Step S702) The recognition unit 531 determines whether an apparatus capable of transmitting/receiving an image signal is included in the image transmitting/receiving system 2 based on a result obtained by searching for another apparatus in the process of step S701. When the recognition unit 531 determines that the apparatus capable of transmitting/receiving the image signal is included in the image transmitting/receiving system 2, the procedure proceeds to a process of step S703. Otherwise, the procedure returns to the process of step S701.

(Step S703) The recognition unit 531 determines whether a reference synchronization signal transmitted from another apparatus has been received in tire reception unit 562 during a constant period. When the recognition unit 531 determines that a reference synchronization signal transmitted from another apparatus has been received in the reception unit 562, the procedure proceeds to a process of step S704. Otherwise, the procedure proceeds to a process of step S709.

(Step S704) The communication control unit 550 matches a reception channel of the reception unit 562 with a channel through which the reference synchronization signal has been transmitted in order to receive the reference synchronization signal. Then, the procedure proceeds to a process of step S705.

(Step S705) The reception unit 562 receives a reference synchronization signal transmitted from the other apparatus. Furthermore, the recognition unit 531 recognizes a timing of a blanking interval based on the reference synchronization signal received in the reception unit 562. Then, the procedure proceeds to a process of step S706.

(Step S706) The control unit 530 determines whether an instruction has been input to the instruction input unit 570. When the control unit 530 determines that an instruction has been input to the instruction input unit 570, the procedure proceeds to a process of step S707. Otherwise, the control unit 530 performs the process of step S706 again.

(Step S707) The recognition unit 531 recognizes whether a current time point is a blanking interval based on the reference synchronization signal received in the reception unit 562 in the process of step S705. When the recognition unit 531 recognizes that the current time point is the blanking interval, the procedure proceeds to a process of step S708. Otherwise, the recognition unit 531 performs the process of step S707 again.

(Step S708) The communication control unit 550 controls the transmission unit 561 to transmit a message based on the instruction input to the instruction input unit 570 in the process of step S706 to another apparatus (the image transmitting apparatus 10 and the received image displaying apparatus 20). Then, the procedure returns to the process of step S706.

(Step S709) The control unit 530 allows the reference synchronization signal generation unit 520 to generate the reference synchronization signal. The reference synchronization signal generation unit 520 generates tire reference synchronization signal. Then, the procedure proceeds to a process of step S710. In addition, the reference synchronization signal generation unit 520 continuously generates the reference synchronization signal until the remote control apparatus 30 is powered off.

(Step S710) The communication control unit 550 acquires display information (the size of image data and the number of frames) from the apparatus capable of transmitting/receiving art image signal based on the result obtained by searching for the terminal detection unit 540 in the process of step S701. Then, the procedure proceeds to a process of step S111.

(Step S711) The communication control unit 550 controls the transmission unit 561 to transmit the reference synchronization signal generated by the reference synchronization signal generation unit 520 to other apparatuses included in the image transmitting/receiving system 2 in the form of a packet. Then, the procedure proceeds to a process of step S712.

(Step S712) The control unit 530 determines whether the reference synchronization signal has been transmitted to all channels. Mien the control unit 530 determines that the reference synchronization signal has been transmitted to all the channels, the procedure proceeds to a process of step S715. Otherwise, the procedure proceeds to a process of step S713.

(Step S713) The recognition unit 531 recognizes whether the blanking interval has ended based on the reference synchronization signal generated by the reference synchronization signal generation unit 520. When the recognition unit 531 recognizes that the blanking interval has ended, the procedure proceeds to a process of step S715. Otherwise, the procedure proceeds to a process of step S714.

(Step S714) The communication control unit 550 changes the communication channel of the transmission unit 561 to a channel through which the reference synchronization signal is not transmitted. Then, the procedure returns to the process of step S712.

(Step S715) The communication control unit 550 returns die communication channel of the transmission unit 561 to the original channel. Then, the procedure proceeds to a process of step S716.

(Step S716) The control unit 530 determines whether an instruction has been input to the instruction input unit 570. When the control unit 530 determines that the instruction has been input to the instruction input unit 570, the procedure proceeds to a process of step S707. Otherwise, the control unit 530 performs the process of step S706 again.

(Step S717) The recognition unit 531 recognizes whether a current time point is a blanking interval based on the reference synchronization signal generated by the reference synchronization signal generation unit 520. When the recognition unit 531 recognizes that the current time point is the blanking interval, the procedure proceeds to a process of step S718. Otherwise, the recognition unit 531 performs the process of step S717 again.

(Step S718) The communication control unit 550 controls the transmission unit 561 to transmit a message based on the instruction input to the instruction input unit 570 in the process of step S716 to another apparatus (the image transmitting apparatus 10 and the received image displaying apparatus 20). Then, the procedure returns to the process of step S711.

In the case in which the aforementioned processes of step S701 to step S718 are performed, when another apparatus transmits no reference synchronization signal, the remote control apparatus 30 is able to generate the reference synchronization signal and transmit the generated reference synchronization signal to other apparatuses in the blanking interval. Furthermore, the other apparatuses having received the reference synchronization signal are able to recognize the image signal transmission timing and the blanking interval based on the reference synchronization signal.

Figure 20:
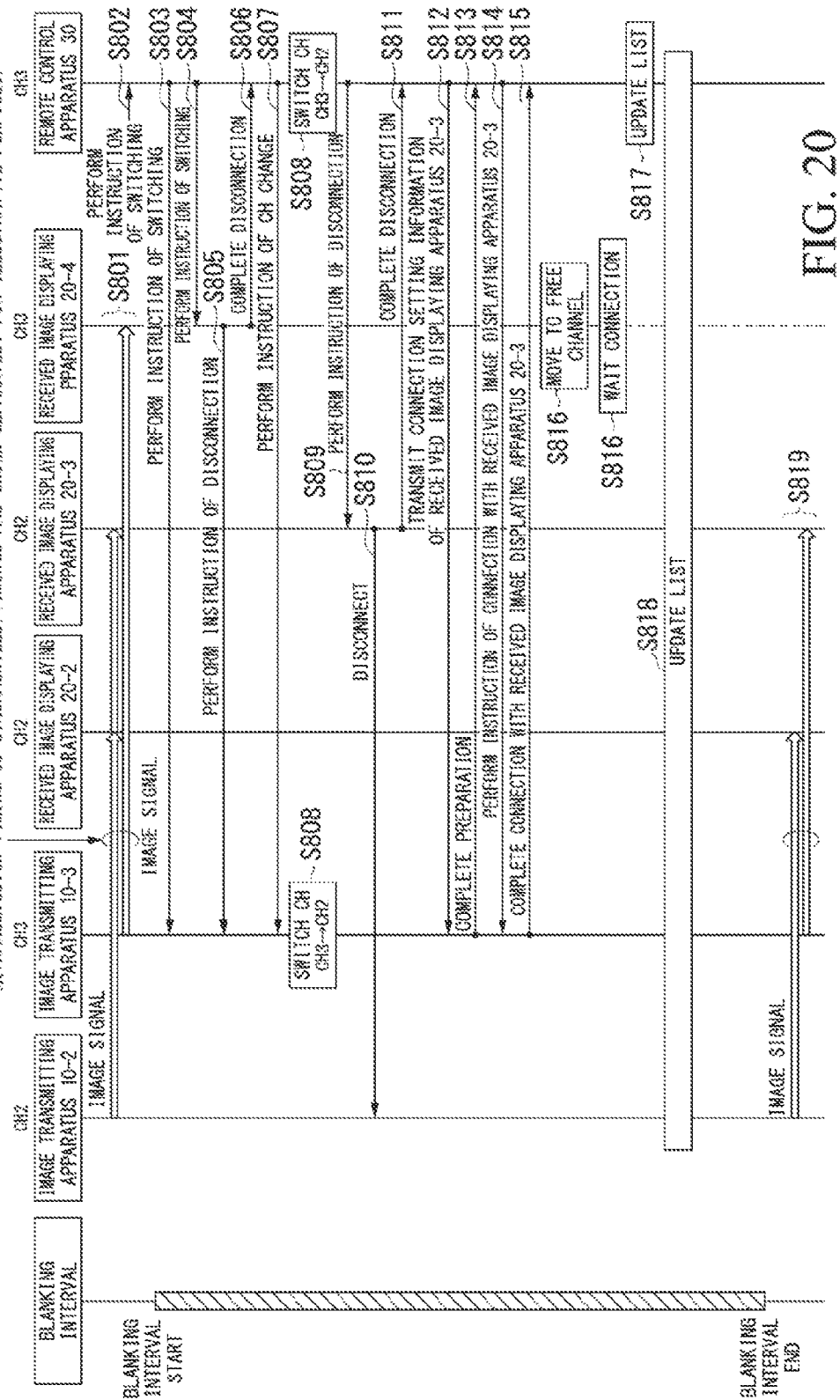
FIG. 20 is a sequence diagram representing an operation procedure when switching a connection between an image transmitting apparatus and a received image displaying apparatus in accordance with a fifth preferred embodiment of the present invention.
Figure 21:
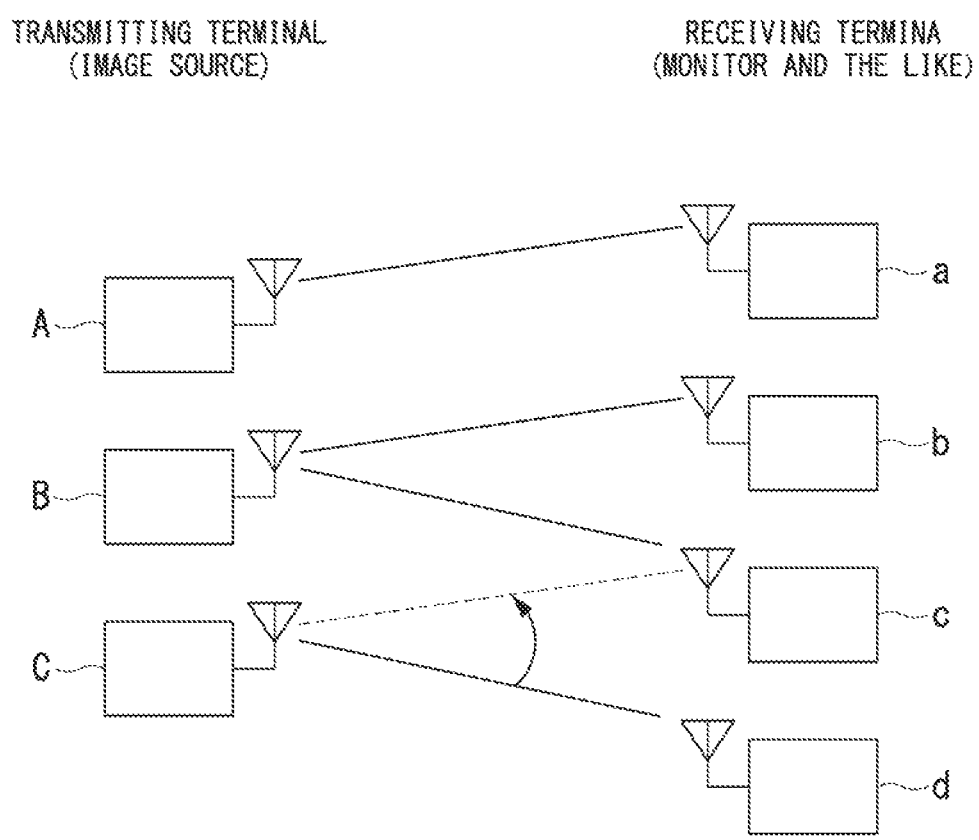
FIG. 21 is a schematic diagram representing the configuration of a conventionally known image transmitting/receiving system.
Figure 22:
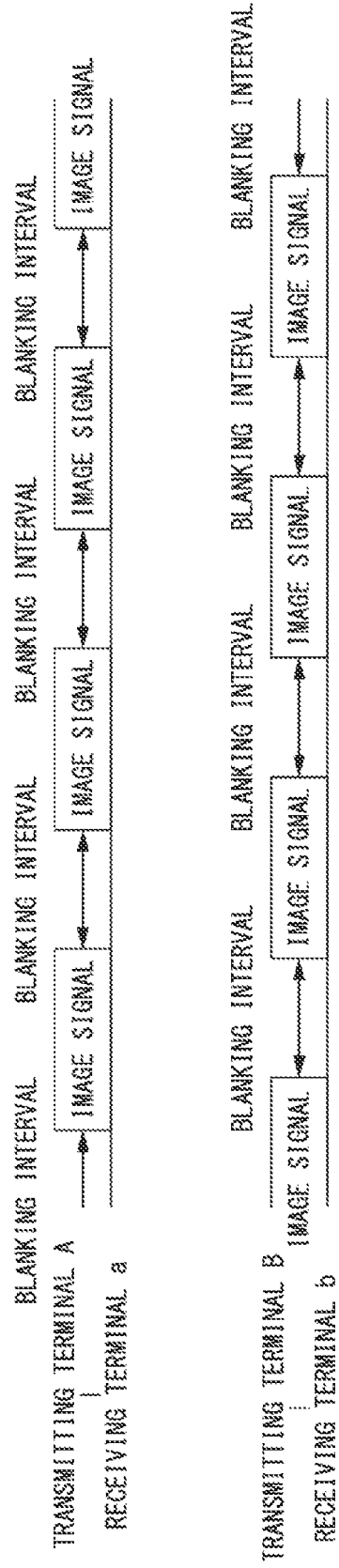
FIG. 22 is a schematic diagram representing image signal transmission timings and blanking intervals in a conventionally known image transmitting/receiving system.

Next, a detailed example when switching a connection between the image transmitting apparatus 10 and the received image displaying apparatus 20 will be described. FIG. 20 is a sequence diagram representing an operation procedure when switching a connection between the image transmitting apparatus 10 and the received image displaying apparatus 20 in accordance with the present preferred embodiment. A vertical axis indicates the passage of time. FIG. 20 illustrates a detailed example of the case in which, when the image transmitting apparatus 10-2 transmits an image signal to the received image displaying apparatuses 20-2 and 20-3 using a communication channel CH2, and the image transmitting apparatus 10-3 transmits an image signal to the received image displaying apparatus 20-4 using a communication channel CH3, a destination to which the image transmitting apparatus 10-3 transmits an image signal is switched to the received image displaying apparatus 20-3 based on a switching instruction of the remote control apparatus 30.

(Step S801) The image transmitting apparatus 10-2 transmits an image signal to the received image displaying apparatuses 20-2 and 20-3, and the image transmitting apparatus 10-3 transmits an image signal to the received image displaying apparatus 20-4. In addition, in FIG. 20, the timing at which the image transmitting apparatus 10-2 transmits the image signal to the received image displaying apparatuses 20-2 and 20-3 is different from the timing at which the image transmitting apparatus 10-3 transmits the image signal to the received image displaying apparatus 20-4. However, this is for illustrative purposes only, and the image transmitting apparatus 10-2 and the image transmitting apparatus 10-3 actually transmit the image signals at the same timing.

(Step S802) The instruction input unit 570 of the remote control apparatus 30 receives the input of an instruction for switching a destination to which the image transmitting apparatus 10-3 transmits an image signal to the received image displaying apparatus 20-3.

(Step S803) The remote control apparatus 30 transmits a switching instruction message to the image transmitting apparatus 10-3.

(Step S804) The remote control apparatus 30 transmits a disconnection instruction message to the received image displaying apparatus 20-4.

(Step S805) The received image displaying apparatus 20-4 transmits the disconnection instruction message to the image transmitting apparatus 10-3, and then disconnects a connection with the image transmitting apparatus 10-3. Furthermore, the image transmitting apparatus 10-3 disconnects a connection with the received image displaying apparatus 20-4.

(Step S806) The received image displaying apparatus 20-4 transmits a disconnection completion message to the remote control apparatus 30.

(Step S807) The remote control apparatus 30 transmits a channel change instruction message to the image transmitting apparatus 10-3.

(Step S808) The remote control apparatus 30 and the image transmitting apparatus 10-3 switch a communication channel from tire CH3 to the CH2.

(Step S809) The remote control, apparatus 30 transmits a disconnection instruction message to the received image displaying apparatus 20-3.

(Step S810) The received image displaying apparatus 20-3 transmits the disconnection instruction message to the image transmitting apparatus 10-2, and then disconnects a connection with the image transmitting apparatus 10-2. Furthermore, the image transmitting apparatus 10-2 disconnects a connection with the received image displaying apparatus 20-3.

(Step S811) The received image displaying apparatus 20-3 transmits a disconnection completion message to the remote control apparatus 30.

(Step S812) The remote control apparatus 30 transmits connection setting information of the received image displaying apparatus 20-3 to the image transmitting apparatus 10-3.

(Step S813) The image transmitting apparatus 10-3 prepares a connection with the received image displaying apparatus 20-3 based on the connection setting information transmitted in the process of step S812, and then transmits a preparation completion message to the remote control apparatus 30.

(Step S814) The remote control apparatus 30 transmits a message for instructing a connection with the received image displaying apparatus 20-3 to the image transmitting apparatus 10-3.

(Step S815) The image transmitting apparatus 10-3 performs a communication connection with the received image displaying apparatus 20-3, and then transmits a connection completion message to the remote control apparatus 30.

(Step S816) The received image displaying apparatus 20-4 transmits information specifying a channel (a free channel) to be used later by the received image displaying apparatus 20-4 to the remote control apparatus 30, changes a communication channel to the free channel, and then waits for a connection.

(Step S817) The remote control apparatus 30 updates a communication channel, which is stored in the pairing list and used by the received image displaying apparatus 20-4, based on the information received in the process of step S816 and specifying the channel (the free channel) to be used later by the received image displaying apparatus 20-4.

(Step S818) The image transmitting apparatuses 10-2 and 10-3, the received image displaying apparatuses 20-2 to 20-4, and the remote control apparatus 30 perform update processes of pairing lists.

(Step S819) After the blanking interval ends, the image transmitting apparatus 10-2 transmits the image signal to the received image displaying apparatus 20-2, and the image transmitting apparatus 10-3 transmits the image signal to the received image displaying apparatus 20-3. In addition, in FIG. 20, the timing at which the image transmitting apparatus 10-2 transmits the image signal to the received image displaying apparatus 20-2 is different from the timing at which the image transmitting apparatus 10-3 transmits the image signal to the received image displaying apparatus 20-3. However, this is for illustrative purposes only, and the image transmitting apparatus 10-2 and the image transmitting apparatus 10-3 actually transmit the image signals at the same timing.

As with the aforementioned processes of step S801 to step S819, when switching a connection destination apparatus, the image transmitting apparatuses 10, the received image displaying apparatuses 20, and the remote control apparatus 30 included in the image transmitting/receiving system 2 perform the transmission/reception of data required in order to switch the connection destination apparatus during the blanking interval. Consequently, it is possible to perform the switching of a communication connection without influencing the transmission/reception of an image signal.

As described above, according to the present preferred embodiment, the remote control apparatus 30 included in the image transmitting/receiving system 2 transmits the reference synchronization signal indicating the transmission timing of the image signal to the image transmitting apparatuses 10. Then, all the image transmitting apparatuses 10 included in the image transmitting/receiving system 2 transmit tire image signal based on the reference synchronization signal. In this way; all the image transmitting apparatuses 10 included in the image transmitting/receiving system 2 are able to allow the timing at which the image signal is transmitted to synchronize with the timing (the blanking interval) at which the image signal is not transmitted. Furthermore, when switching a connection destination apparatus, the image transmitting apparatuses 10, the received image displaying apparatuses 20, and the remote control apparatus 30 included in the image transmitting/receiving system 2 perform the transmission/reception of data required in order to switch the connection destination apparatus during the blanking interval. Consequently; it is possible to perform the switching of a communication connection without influencing the transmission/reception of an image signal.

So far, the first preferred embodiment to the fifth preferred embodiment of the present invention have been described in detail with reference to the accompanying drawings. However, detailed configurations are not limited to these preferred embodiments. For example, a design and the like within the range without departing from the scope of the present invention may also be included.

For example, in the aforementioned preferred embodiments, the image transmitting/receiving system 1 includes three image transmitting apparatuses 10 and four received image displaying apparatuses 20. However, the present invention is not limited thereto. For example, the image transmitting/receiving system 1 may include one or more image transmitting apparatuses 10 and one or more received image displaying apparatuses 20. Furthermore, in the aforementioned preferred embodiments, the image transmitting/receiving system 2 includes three image transmitting apparatuses 10, four received image displaying apparatuses 20, and one remote control apparatus 30. However, the present invention is not limited thereto. For example, the image transmitting/receiving system 2 may include one or more image transmitting apparatuses 10, one or more received image displaying apparatuses 20, and one or more remote control apparatuses 30.

The present invention can be extensively applied to an image transmitting/receiving system, an image transmitting apparatus, a received image displaying apparatus, and a wireless control apparatus, and can perform the switching of a communication connection without influencing the transmission/reception of an image signal.

According to the image transmitting/receiving system of a preferred embodiment of the present invention, it is possible to start the disconnection process of wireless communication within the period of the vertical blanking interval, so that it is possible to perform the switching of a communication connection without influencing the transmission/reception of an image signal.

According to the image transmitting apparatus of a preferred embodiment of the present invention, it is possible to start the disconnection process of wireless communication within the period of the vertical blanking interval, so that it is possible to perform the switching of a communication connection without influencing the transmission/reception of an image signal.

According to the received image displaying apparatus of a preferred embodiment of the present invention, it is possible to start the disconnection process of wireless communication within the period of the vertical blanking interval, so that it is possible to perform the switching of a communication connection without influencing the transmission/reception of an image signal.

According to the wireless apparatus of a preferred embodiment of the present invention, it is possible to wirelessly transmit the reference synchronization signal to another apparatus and for the other apparatus having received the reference synchronization signal to start the disconnection process of wireless communication based on the reference synchronization signal, so that it is possible to perform the switching of a communication connection without influencing the transmission/reception of an image signal.

According to the image transmitting/receiving method of a preferred embodiment of the present invention, it is possible to start the disconnection process of wireless communication within the vertical blanking interval, so that it is possible to perform the switching of a communication connection without influencing the transmission/reception of an image signal.

What is claimed is:

1. An image transmitting/receiving system comprising:
a plurality of image transmitting apparatuses each of which continuously wirelessly transmits continuously captured frame images in a captured order; and
a plurality of received image displaying apparatuses each of which continuously wirelessly receives the frame images continuously wirelessly transmitted by the plurality of image transmitting apparatuses and continuously displays the received frame images in the captured order, wherein
the image transmitting apparatus comprises:
a first wireless communication unit that wirelessly transmits the frame images to the received image displaying apparatus, which has established a wireless communication connection with the image transmitting apparatus, in synchronization with a reference synchronization signal, the received image displaying apparatus comprises:
a second wireless communication unit that wirelessly receives the frame images transmitted from the image transmitting apparatus having established a wireless communication connection with the received image displaying apparatus; and a display unit that displays the frame images, which have been wirelessly received in the second wireless communication unit, in the captured order of the frame images, at least one apparatus of the image transmitting apparatus and the received image displaying apparatus included in the image transmitting/receiving system comprises:
 a reference synchronization signal generation unit that generates the reference synchronization signal; and
 a control unit that determines whether or not one of the first wireless communication unit and the second wireless communication unit, which is included in the at least one apparatus having the control unit, has received the reference synchronization signal within a predetermined period and controls the one of the first wireless communication unit and the second wireless communication unit, which is included in the at least one apparatus having the control unit, to wirelessly transmit the reference synchronization signal to another of the at least one apparatus included in the image transmitting/receiving system if the control unit determined that the one of the first wireless communication unit and the second wireless communication unit, which is included in the at least one apparatus having the control unit, has not received the reference synchronization signal within the predetermined period, and at least one apparatus of the image transmitting apparatus and the received image displaying apparatus comprises:
 a blanking interval recognition unit that recognizes a vertical blanking interval of a frame image; and
 a disconnection control unit that controls one of the first wireless communication unit and the second wireless communication unit, which is included in the at least one apparatus having the disconnection control unit, to start a disconnection process of wireless communication within a period of the vertical blanking interval recognized by the blanking interval recognition unit.

2. The image transmitting/receiving system according to claim 1, wherein the disconnection control unit, which is provided in the at least one apparatus of the image transmitting apparatus and the received image displaying apparatus, controls the one of the first wireless communication unit and the second wireless communication unit, which is included in the at least one apparatus having the disconnection control unit, not to perform the disconnection process outside of the vertical blanking interval.

3. The image transmitting/receiving system according to claim 1, wherein the blanking interval recognition unit recognizes the vertical blanking interval based on the frame image or the reference synchronization signal.

4. An image transmitting apparatus in an image transmitting/receiving system that comprises: a plurality of image transmitting apparatuses each of which continuously wirelessly transmits continuously captured frame images in a captured order; and a plurality of received image displaying apparatuses each of which continuously wirelessly receives the frame images continuously wirelessly transmitted by the plurality of image transmitting apparatuses and continuously displays the received frame images in the captured order, the image transmitting apparatus comprising:
 a wireless communication unit that wirelessly transmits the frame images to the received image displaying apparatus, which has established a wireless communication connection with the image transmitting apparatus, in synchronization with a reference synchronization signal;
 a reference synchronization signal generation unit that generates the reference synchronization signal;
 a control unit that determines whether or not the wireless communication unit, which is included in at least one apparatus of the plurality of image transmitting apparatuses having the control unit, has received the reference synchronization signal within a predetermined period and controls the wireless communication unit, to wirelessly transmit the reference synchronization signal to another of the at least one apparatus included in the image transmitting/receiving system if the control unit determined that the wireless communication unit, which is included in the at least one apparatus having the control unit, has not received the reference synchronization signal within the predetermined period;
 a blanking interval recognition unit that recognizes a vertical blanking interval of a frame image; and
 a disconnection control unit that controls the wireless communication unit to start a disconnection process of wireless communication within a period of the vertical blanking interval recognized by the blanking interval recognition unit.

5. The image transmitting apparatus according to claim 4, wherein the control unit controls the wireless communication unit to transmit the reference synchronization signal within the vertical blanking interval.

6. The image transmitting apparatus according to claim 4, further comprising:
 a detection unit that detects a plurality of communication channels used when another image transmitting apparatus included in the image transmitting/receiving system wirelessly transmits the frame image, wherein
  the control unit controls the wireless communication unit to transmit the reference synchronization signal through each communication channel detected by the detection unit.

7. The image transmitting apparatus according to claim 6, wherein,
 when the detection unit detects the plurality of communication channels, the control unit controls the wireless communication unit to transmit the reference synchronization signal through only some of the plurality of communication channels detected by the detection unit, in a single vertical blanking interval.

8. The image transmitting apparatus according to claim 7, wherein the wireless communication unit is controlled to transmit the reference synchronization signal through one of the plurality of communication channels detected by the detection unit, in the single vertical blanking interval.

9. The image transmitting apparatus according to claim 4, further comprising:
 an instruction receiving unit that receives an instruction for addition, modification, and deletion of a transmission destination of the frame image, wherein,
  when the instruction receiving unit receives the instruction, the disconnection control unit controls the wireless communication unit to start the disconnection process.

10. The image transmitting apparatus according to claim 9, further comprising:
 an operation unit that receives an operation by a user, wherein
  the instruction receiving unit receives the instruction based on the operation received in the operation unit.

11. The image transmitting apparatus according to claim 9, wherein the instruction receiving unit receives the instruction from another apparatus included in the image transmitting/receiving system through the wireless communication unit.

12. The image transmitting apparatus according to claim 4, wherein the disconnection control unit controls the wireless communication unit not to perform the disconnection process outside of the vertical blanking interval.

13. A received image displaying apparatus in an image transmitting/receiving system that comprises: a plurality of image transmitting apparatuses each of which continuously wirelessly transmits continuously captured frame images in a captured order; and a plurality of received image displaying apparatuses each of which continuously wirelessly receives the frame images continuously wirelessly transmitted by the plurality of image transmitting apparatuses and continuously displays the received frame images in the captured order, the received image displaying apparatus comprising:
 a wireless communication unit that wirelessly receives the frame images from the image transmitting apparatus having established a wireless communication connection with the received image displaying apparatus;
 a display unit that displays the frame images wirelessly received in the wireless communication unit, in the captured order of the frame images;
 a reference synchronization signal generation unit that generates a reference synchronization signal;
 a control unit that determines whether or not the wireless communication unit, which is included in at least one apparatus of the plurality of received image displaying apparatuses having the control unit, has received the reference synchronization signal within a predetermined period and controls the wireless communication unit, to wirelessly transmit the reference synchronization signal to another of the at least one apparatus included in the image transmitting/receiving system if the control unit determined that the wireless communication unit, which is included in the at least one apparatus having the control unit, has not received the reference synchronization signal within the predetermined period;
 a blanking interval recognition unit that recognizes a vertical blanking interval of a frame image; and
 a disconnection control unit that controls the wireless communication unit to start a disconnection process of wireless communication within a period of the vertical blanking interval recognized by the blanking interval recognition unit.

14. The received image displaying apparatus according to claim 13, wherein the wireless communication unit wirelessly receives the frame images in a form of packet data, and the reference synchronization signal generation unit generates the reference synchronization signal based on packet data, which indicates final data of each frame of the frame images, among the packet data wirelessly received in the wireless communication unit.

15. The received image displaying apparatus according to claim 13, wherein the control unit controls the wireless communication unit to wirelessly transmit the reference synchronization signal generated by the reference synchronization signal generation unit, according to packet data indicating a response for packet data, which indicates final data of each frame of the frame images, among the packet data wirelessly received in the wireless communication unit.

16. The received image displaying apparatus according to claim 13, wherein the wireless communication unit wirelessly receives the frame images in a form of packet data, and the blanking interval recognition unit recognizes the vertical blanking interval of the frame image based on whether the packet data wirelessly received in the wireless communication unit is packet data indicating final data of each frame of the frame images.

17. The received image displaying apparatus according to claim 13, further comprising:
 a detection unit that detects a plurality of communication channels used when another image transmitting apparatus included in the image transmitting/receiving system wirelessly transmits the frame image, wherein
  the control unit controls the wireless communication unit to transmit the reference synchronization signal through each communication channel detected by the detection unit.

18. The received image displaying apparatus according to claim 17, wherein,
 when the detection unit detects the plurality of communication channels, the control unit controls the wireless communication unit to transmit the reference synchronization signal through only some of the plurality of communication channels detected by the detection unit, in a single vertical blanking interval.

19. The received image displaying apparatus according to claim 18, wherein the control unit controls the wireless communication unit to transmit the reference synchronization signal through one of the plurality of communication channels detected by the detection unit, in the single vertical blanking interval.

20. The received image displaying apparatus according to claim 13, further comprising:
 an instruction receiving unit that receives an instruction for addition, modification, and deletion of a transmission destination of the frame image, wherein,
  when the instruction receiving unit receives the instruction, the disconnection control unit controls the wireless communication unit to start the disconnection process.

21. The received image displaying apparatus according to claim 20, further comprising:
 an operation unit that receives an operation by a user, wherein
  the instruction receiving unit receives the instruction based on the operation received in the operation unit.

22. The received image displaying apparatus according to claim 20, wherein the instruction receiving unit receives the instruction from another apparatus included in the image transmitting/receiving system through the wireless communication unit.

23. The received image displaying apparatus according to claim 13, wherein the disconnection control unit controls the wireless communication unit not to perform the disconnection process outside of the vertical blanking interval.

24. An image transmitting/receiving method in an image transmitting/receiving system that comprises; a plurality of image transmitting apparatuses each of which continuously wirelessly transmits continuously captured frame images in a captured order; and a plurality of received image displaying apparatuses each of which continuously wirelessly receives the frame images continuously wirelessly transmitted by the plurality of image transmitting apparatuses and continuously displays the frame images in the captured order, the image transmitting/receiving method comprising:
 a wireless transmission step of wirelessly transmitting, by a wireless communication unit of the image transmitting apparatus, the frame images to the received image displaying apparatus, which has established a wireless communication connection with the image transmitting apparatus, in synchronization with a reference synchronization signal;

a wireless reception step of wirelessly receiving, by a wireless communication unit of the received image displaying apparatus, the frame images transmitted from the image transmitting apparatus having established a wireless communication connection with the received image displaying apparatus;

a display step of displaying, by a display unit of the received image displaying apparatus, the frame images, which have been wirelessly received in the wireless communication unit included in the received image displaying apparatus, in the captured order of the frame images;

a reference synchronization signal generation step of generating, by a reference synchronization signal generation unit of at least one of the image transmitting apparatus and the received image displaying apparatus included in the image transmitting/receiving system, the reference synchronization signal;

a control step of controlling, by a control unit of at least one apparatus of the image transmitting apparatus and the received image displaying apparatus included in the image transmitting/receiving system, the reference synchronization signal generation unit to generate the reference synchronization signal and determining whether or not the wireless communication unit, which is included in the at least one apparatus having the control unit, has received the reference synchronization signal within a predetermined period and controlling the wireless communication unit, to wirelessly transmit the reference synchronization signal to another of the at least one apparatus included in the image transmitting/receiving system if the control unit determined that the wireless communication unit, which is included in the at least one apparatus having the control unit, has not received the reference synchronization signal within the predetermined period a blanking interval recognition step of recognizing, by a blanking interval recognition unit of at least one of the image transmitting apparatus and the received image displaying apparatus, a vertical blanking interval of a, frame image; and a disconnection control step of controlling, by a disconnection control unit of at least one apparatus of the image transmitting apparatus and the received image displaying apparatus, the wireless communication unit included in the at least one apparatus having the disconnection control unit to start a disconnection process of wireless communication within a period of the vertical blanking interval recognized by the blanking interval recognition unit.

* * * * *